(12) United States Patent
Peng

(10) Patent No.: US 7,200,877 B2
(45) Date of Patent: Apr. 10, 2007

(54) DUAL FLUSH WATER SAVING TOILET SYSTEM

(76) Inventor: Karl Peng, 22714 Coachlight Cir., Taylor, MI (US) 48180

( * ) Notice: Subject to any disclaimer, the term of this patent is extended or adjusted under 35 U.S.C. 154(b) by 215 days.

(21) Appl. No.: 10/708,970

(22) Filed: Apr. 4, 2004

(65) Prior Publication Data

US 2005/0217012 A1    Oct. 6, 2005

(51) Int. Cl.
*E03D 1/14* (2006.01)
*E03D 3/12* (2006.01)

(52) U.S. Cl. .......................................... 4/325

(58) Field of Classification Search ............ 4/324–325, 4/378, 390–391
See application file for complete search history.

(56) References Cited

U.S. PATENT DOCUMENTS 4,604,763 A * 8/1986 Sprang ........................... 4/391
6,484,327 B2 * 11/2002 Hand ............................. 4/326

* cited by examiner

Primary Examiner—Charles E. Phillips

(57) ABSTRACT

A dual flush toilet system (120) with a water tank (122), a discharge opening (159), a flush valve (156), and a toilet bowl, is provided with a dual action flush lever (130) for actuating a full or a partial flush operation, an engaging device (161) with a V-shaped groove (160) for selectively engaging the flush valve (156) in both upward or downward movements and rotations about a vertical axis, a travel limit device (141) for limiting the maximum vertical travels of the flush valve (146), a load device (420) for selectively applying a downward load to the flush valve (156) to forcibly push the flush valve (156) down to close the discharge opening (159), and an electronic control system (1020) for electronically regulating the volumes of water used to flush the dual flush toilet system (120) according to the wastes in the toilet bowl. The dual flush toilet system (120) can perform a full or a partial flush operation through controlling the volumes of the water used to flush the wastes by selectively limiting the maximum travels of the flush valve (156), applying a downward load to forcibly push the flush valve (156) down to close the discharge opening (159), using an electronic control device (1020) to control the duration of flushing, or utilizing the differences of the physical properties of air and water flowing through different sizes of holes at different elevations on biased rotations of the flapper valve (1130) to control the duration of the flapper valve (1130) in an open position.

6 Claims, 16 Drawing Sheets

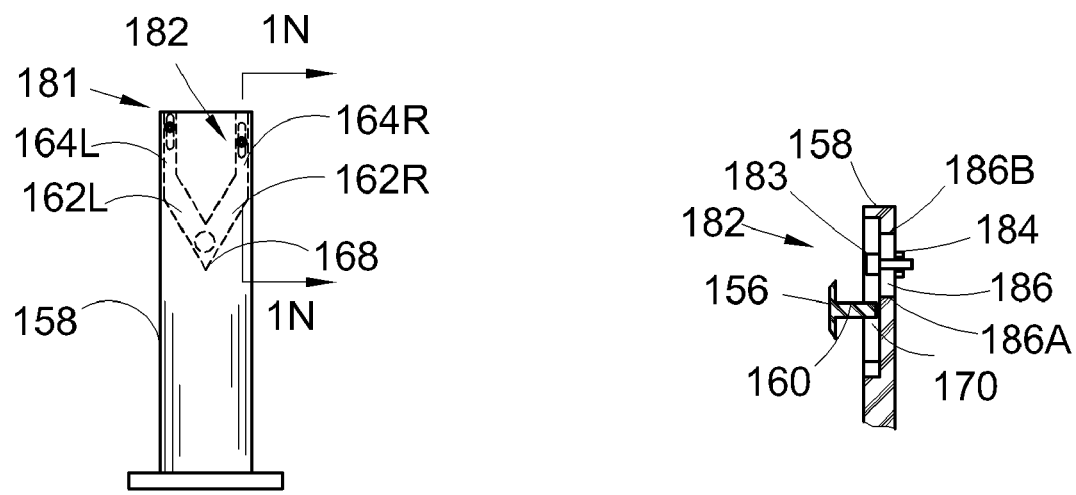
FIG. 1M
FIG. 1N
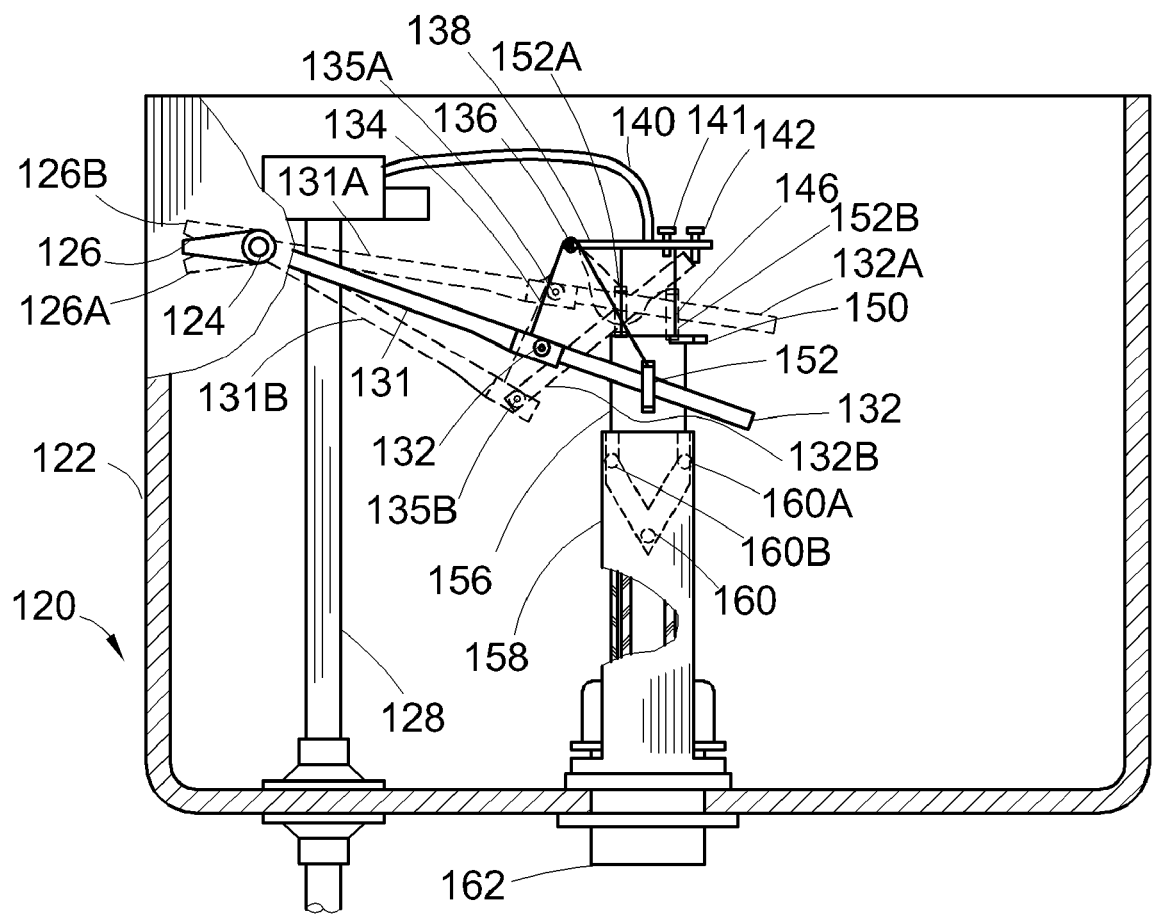
FIG. 2

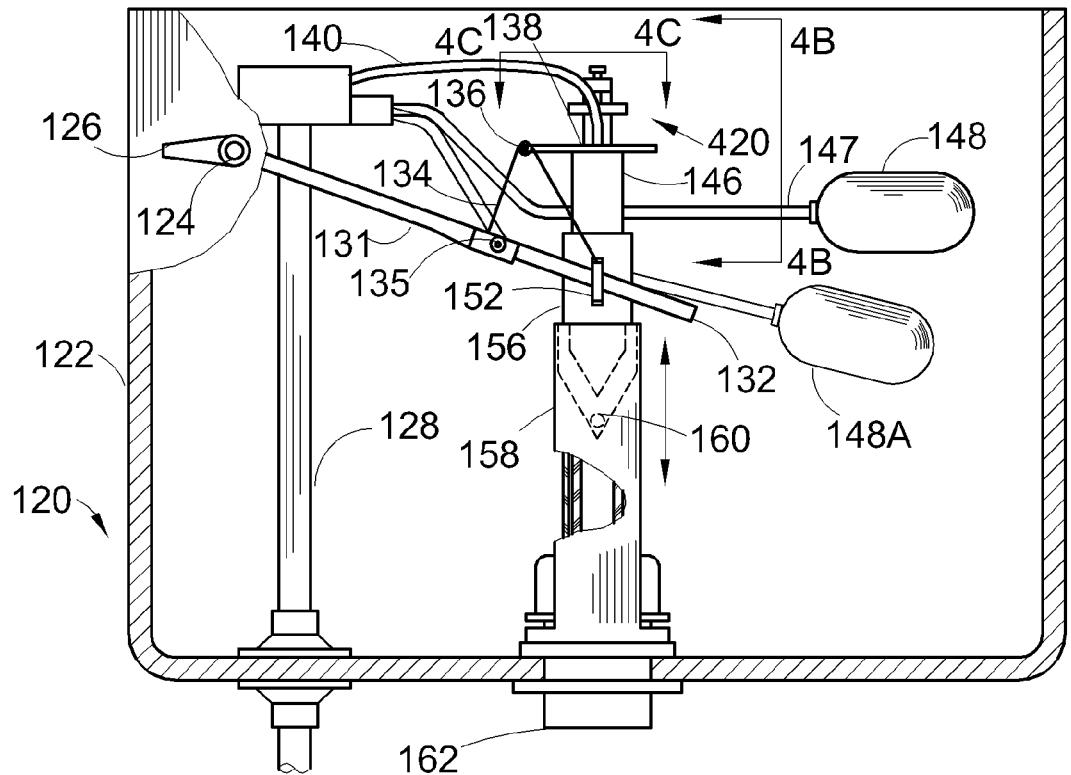
FIG. 4A
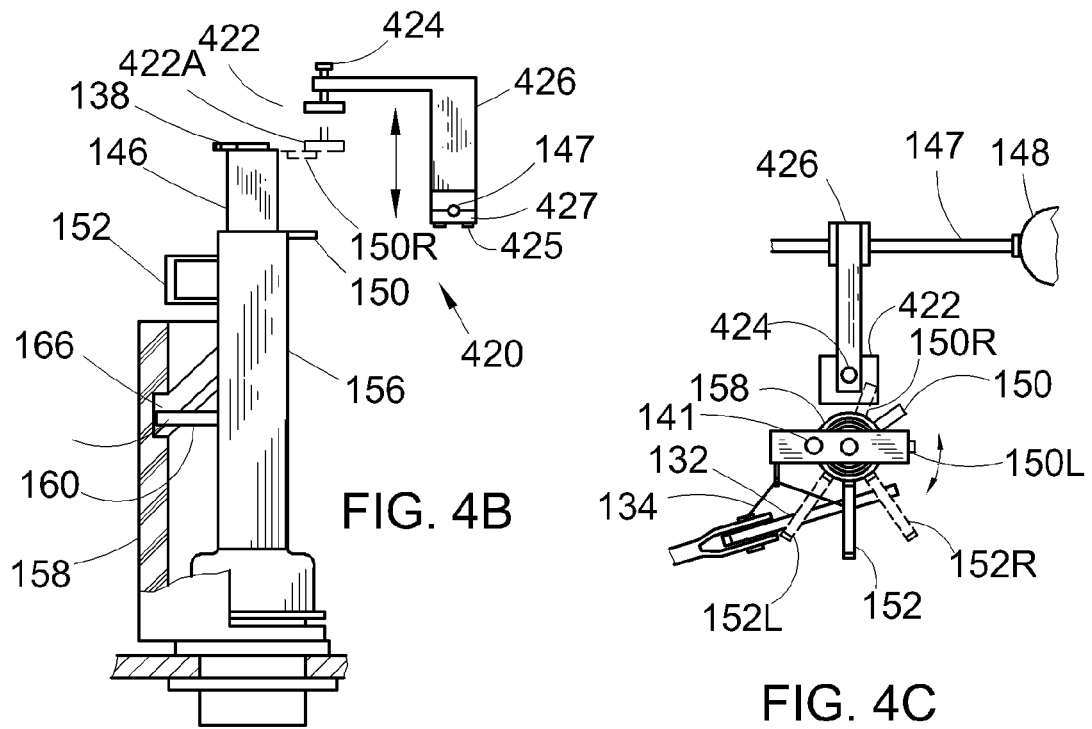
FIG. 4B
FIG. 4C

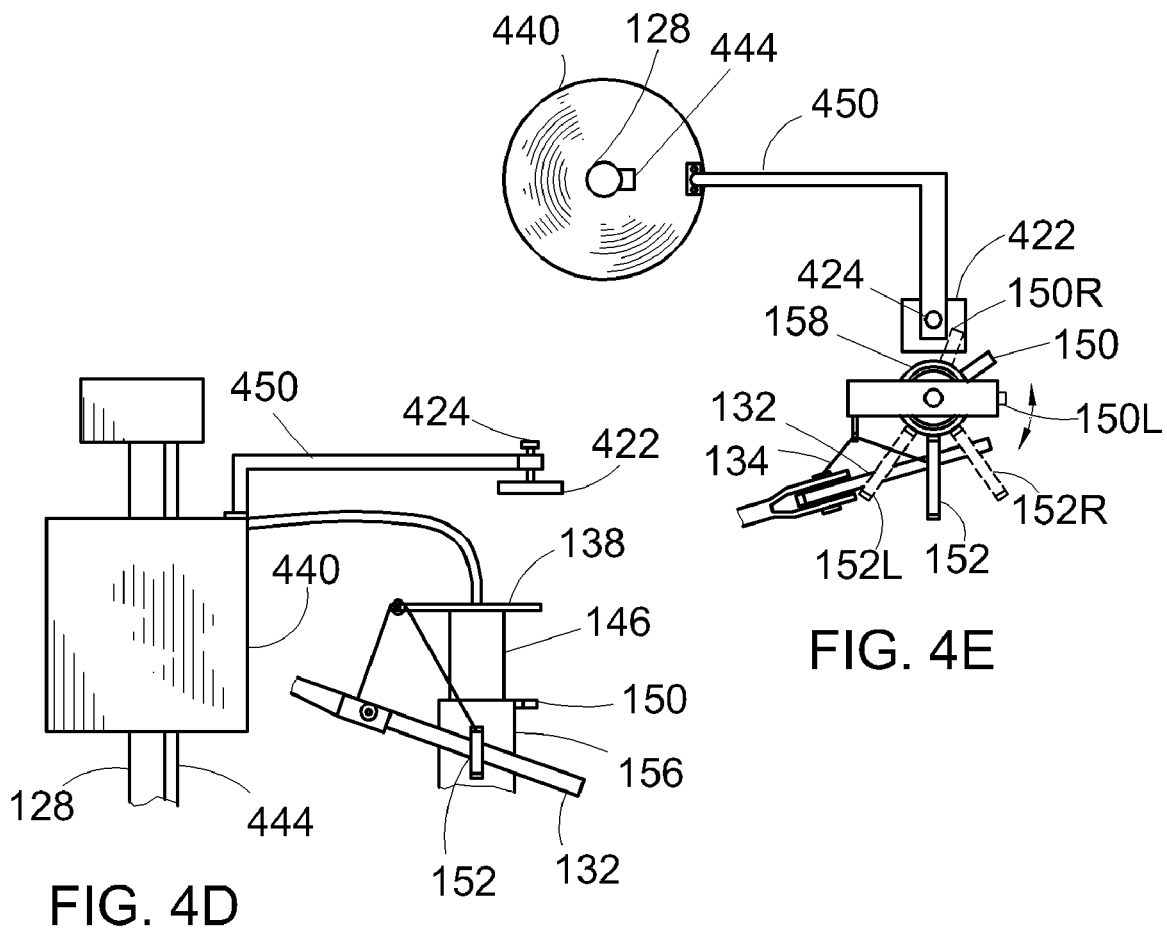
FIG. 4D
FIG. 4E
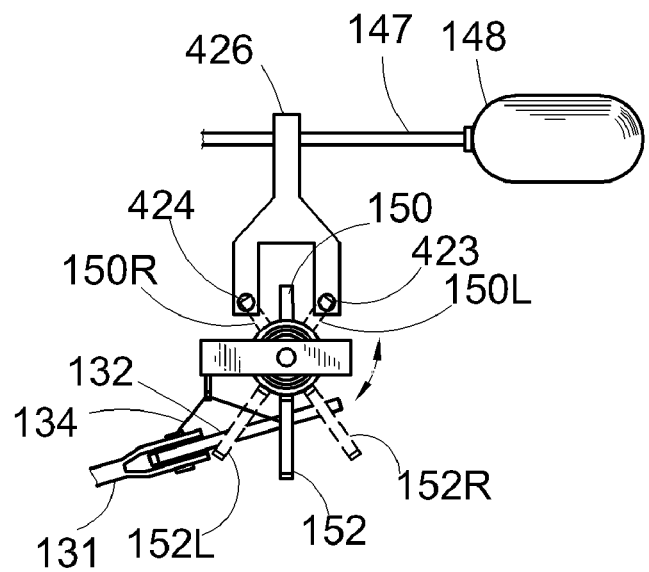
FIG. 4F

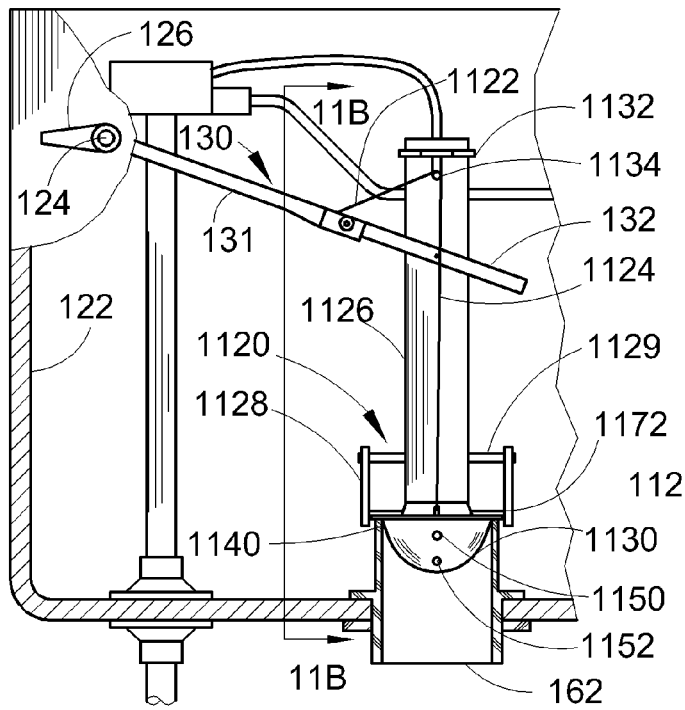
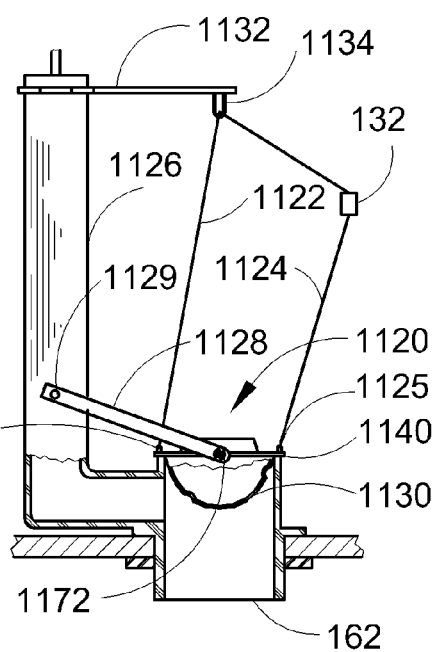
FIG. 11A  FIG. 11B
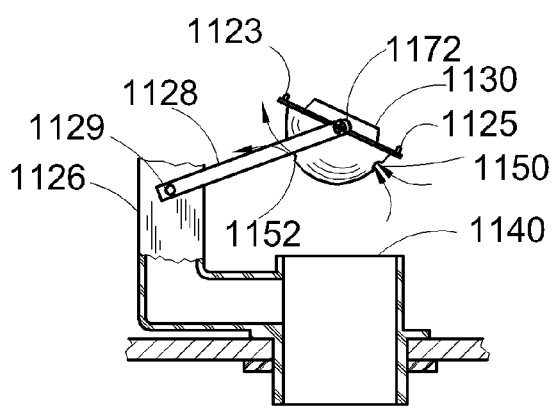
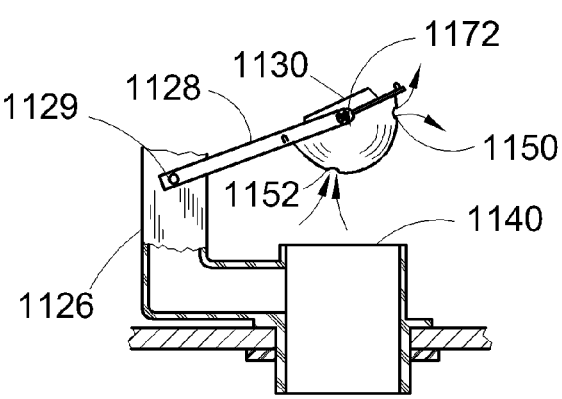
FIG. 11C  FIG. 11D

DUAL FLUSH WATER SAVING TOILET SYSTEM

BACKGROUND OF INVENTION

This invention generally relates to a water-saving dual flush toilet system. More specifically, this invention relates to the efficient use of water in the holding tank of the toilet to selectively flush fluid or solid human wastes into sewers, septic tanks, or other sewage treatment system.

Water is in short supply in many places around the world. As population grows, the water usage increases accordingly. In the past numerous efforts have been made to conserve water usage including efforts to reduce the amount of water to flush toilets. Some of the inventions employ devices with two discharge openings: one is located above the other to use different volumes of water in the toilet tank to flush solid waste or liquid waste in the toilet bowl. Such approach has disadvantages. During the flushing as the water level lowers to the bottom of the toilet water tank the water pressure becomes lower. With lower water pressure, the flushing of the wastes can be less effective. Hence, either a large volume of water is needed to complete the flushing or multiple flushes are required to achieve satisfactory flushing results. As a result, excessive amount of water is consumed to flush the toilet.

To solve this problem, a dual flushing toilet system has been invented with selectively activating the toilet flushing mechanism to consume proper volume of water to flush the solid waste or the liquid waste while maintaining a highest possible water pressure during the flush operation. The water level in the toilet water tank stays above the discharge opening before the flush valve drops down and seals the discharge opening of the dual flush toilet. To flush the solid waste, a regular volume of water is used; to flush the liquid waste, a smaller volume of water is used.

At present two types of flush valves are widely used in various toilet systems. One type of flush valve is a plunger-shaped valve with a floating chamber at the bottom and a tubular portion on the upper portion of the flush valve. The tubular potion acts as an overflow pipe to drain the water into the toilet in case the inlet valve malfunctions. The bottom flange of the flush valve is seated against the discharge opening. This type of flush valve integrates the float chamber and the overflow pipe into one unit. It can generally slidably move upwardly and downwardly with the guidance of a spud secured on the discharge opening of the toilet water tank. A flush lever is used to activate the valve to move upwardly to open the discharge opening. When the flush valve is in the open position, the water in the toilet tank is discharged into the toilet bowl to flush the waste. As the level of the water in the tank lowers, the bottom of the flush valve becomes closer to the discharge opening and the buoyancy from the chamber of the flush valve becomes less. Hence, when the weight of the flush valve becomes greater than the buoyancy of the chamber of the flush valve, the flush valve drops down and closes the discharge opening. As the water inside the water tank drops, a float inside the water tank activates a water inlet valve to permit the water to flow into the toilet tank and refill the water. When the water level inside the water tank reaches the predetermined level, the float deactivates the water inlet valve to shut the water off.

Another type of flush valve has a generally hemisphere-shaped flapper valve body with a chamber in the lower portion. The flapper valve can pivotally rotate about a horizontal axis of a frame mounted primarily on the bottom portion of a vertical overflow pipe. A flush lever controls the hemisphere-shaped flush valve. The flush lever lifts the flush valve up, opens the water discharge opening, and permits the water from the toilet tank to flow into the toilet bowl to flush the wastes. The flush valve closes when the gravity of the valve is greater than the buoyancy of the flapper valve as the water level in the water tank lowers. The refill process is the same as the one described above.

It is generally recognized that vast majority of the dual action water saving toilet devices are developed around the hemisphere-shaped flush valves that employ two discharge openings. The volumes of water discharged through these two discharge openings are different because the two discharge openings are located at different elevations inside the toilet tank. However, there are three major disadvantages of these devices. First, each discharge opening permits the water above the discharge opening to be discharge into the toilet bowl. For different sizes of the toilet tank, their surface areas are different. This makes the volume of water consumed vary greatly. Second, dual flush toilets require a user to push, hold, and then release the flush handle. This operation requirement is inconvenient to the user. It is very difficult to control the timing to hold the flush handle. If the user holds the lever handle too long, excessive amount of water is used to flush the toilet; if the user releases the lever handle too soon, insufficient amount of water is used to flush the waste. As a result, multiple flushes may occur. Third, some of the mechanisms employed to control the dual flush operations are so complicated that they are expensive to manufacture, difficult to install, and inflexible to accommodate the various toilet tanks to achieve effective flushing results.

Very few efforts have been made for a dual flush toilet for the plunger-shaped flush valve toilet system in which the overflow pipe and the float chamber are integrated as one unit, because it is more difficult to develop a device to perform the dual flush functions than the hemisphere-shaped flash valve.

U.S. Pat. No. 6,317,899 to Brewer discloses a dual flush water conservation toilet including separate filling tanks in the toilet. A user can selectively empty different tanks to flush the solid or liquid waste. However, such approach to empting the whole tank of water cannot employ the water pressure to flush the waste effectively. It is also complex to manufacture and difficult to make adjustments.

One approach to achieving selective flushing is to place two separate flushing valves and on two discharge openings at different elevations. U.S. Pat. No. 4,069,591 to Awis, U.S. Pat. No. 4,172,299 to Pozo, U.S. Pat. No. 4,175,295 to Cameron, U.S. Pat. No. 4,504,984 to Burns, U.S. Pat. No. 5,042,096 to Bolli, U.S. Pat. No. 5,067,180 to Figeroid, U.S. Pat. No. 5,887,292 to Goren, U.S. Pat. No. 5,813,059 to Wang, U.S. Pat. No. 6,041,452 to Hsiao, and U.S. Pat. No. 6,571,400 to Reid, primarily employ two discharge openings in the water tank. Different activating mechanisms are employed to activate each valve to control the volume of water discharging through the discharge opening into the toilet bowl to flush the waste. Each invention uses a different activating mechanism to control the flash valves. However, all the inventions have some disadvantages. First, they are too complicated to manufacture. Second, water pressure drops down to almost zero when the water level lowers to the discharge openings. The lower water pressure makes the toilet flushing less effective.

Another type of invention for the dual flush toilet requires a user to hold the lever handle to control the amount of water used to flush the waste.

U.S. Pat. No. 4,837,867 to Miller shows a dual toilet flush system. This system employs one flap valve to control the volume of water to be used to flush the toilet. However, the user must hold the handle to keep the flush valve partially open to determine the time to flush the toilet. This operation requires that the user determine the flushing time, which makes it difficult to control the proper volume of water to flush the waste. It is also inconvenient for a user to hold the lever handle.

U.S. Pat. No. 5,073,995 to Jennison discloses a water saving device for flushing tank including a floating body mounted on a standpipe of the tank. The floating body can move upwardly or downwardly to forcibly contact the flushing valve. The weight of the floating body can be adjusted. This device can close the flushing valve before the water level reach the point that the gravity of the valve is greater than the buoyancy from the water to cause the valve to close down. However, there is no function to selectively control the water level. With the variations of the toilet tanks, such device cannot be adjusted to fit different toilet tanks.

U.S. Pat. No. 5,105,480 to Howell discloses a device that a pivoting cup is mounted on the toilet flap valve. Two flexible actuating elements control the position of the cup. A full flush or a partial flush can be achieved by controlling the orientation of a cup above the flush valve. However, the device is complicated and the pivoting cap is an extra element. Various factors such as precisely maintaining the positions of the parts can affect the functionality of the device.

U.S. Pat. No. 5,129,110 to Richter uses one flushing valve to achieve the selectable flushing function. This device needs a user to hold the flushing lever handle to control the time of flushing. Such operation varies greatly from different users. If a user cannot properly control the timing, either excessive water is used to flush the waste or insufficient water is discharged into the toilet bowl. In the later case, a second flush may be needed to obtain a satisfactory flushing result.

U.S. Pat. No. 5,191,662 to Sharrow discloses a device that is similar to U.S. Pat. No. 5,129,110. It also requires a user to hold down the flush handle to control the amount of water to flush.

U.S. Pat. No. 5,289,594 to Wiewiorowski discloses a toilet flush control system. This toilet flush control system provides a control over the volume of water used in conventional tank toilets. The disclosed toilet flush control apparatus and method can be used in existing toilets by easily retrofitting such toilets with said apparatus. The toilet flush control apparatus may also be incorporated into the design of new toilets. The apparatus comprises a flapper-type flush valve which by itself does not have adequate buoyancy to remain open during the flush cycle of a toilet and which is equipped with an eyelet member; a buoyant member capable of imparting the needed buoyancy to the valve during the flush cycle; a flexible line connected at one end to the buoyant member and passing through said eyelet, and mechanism for adjusting the vertical distance between the flush valve and the buoyant member from outside the toilet tank. The volume of water saved during flushing is equivalent to the volume of water between the level of the flush valve and the level of the buoyant member. However, this system cannot be easily operated and the buoyancy member can only be adjusted one at time. This toilet flushing system cannot selectively adjust the volume of water for flushing different wastes.

U.S. Pat. No. 5,319,809 to Testa shows a single valve dual module toilet flush system. However, this system needs a user to press the handle and hold and then release it to control the volume of water to be used. It is very difficult for a user to determine the duration of flushing the waste.

U.S. Pat. No. 5,855,025 to Williams discloses a single valve controlled toilet system. A water saver is inserted in place of a tube touted from the water inlet valve assembly to the overflow pipe. The pressured water is used to aid gravity to the valve in closing the flapper valve to seal the flush valve. However, the adjustment of the device is complicated and the adjustment is not convenient.

U.S. Pat. No. 5,996,135 to Hsieh discloses single valve controlled water saving toilet system. It employs a pull cord and a handle to control the volume of water used to flush the toilet. However, a user has to pull the cord to control the smaller amount of water to flush the toilet. The user has to decide how long to hold and release the pull cord. It is not convenient for a user to precisely control the proper amount of time to effectively complete the flushing task.

U.S. Pat. No. 5,031,254 to Rise discloses a toilet system to control the volume of water to flush the toilet. This toile flushing system employs a hollow valve with one opening at the bottom with a floating chamber to control the time for the valve to stay open. This system is complicated to manufacturing and difficult to assemble.

U.S. Pat. No. 5,966,749 to Goesling shows an adjustable toilet flush valve. This system has multiple holes on the Valve. The flush volume can be controlled by rotating the position of the valve to change the positions of the hole to control the time for the valve to stay open. However, this device does not have dual flush capability and cannot selectively to flush the different wastes once its position is set.

U.S. Pat. No. 6,151,724 to Klingenstein shows a single flap valve toilet system. It employs a floating ball to aid to close the valve before the water in the water tank drains to the bottom. This system does not have convenient adjusting functions to accommodate different toilet tanks.

U.S. Pat. No. 6,467,100 to Leach shows a water conservative toilet system that employs one single valve and a dual action handle to perform the flushing. Again, this system needs a user to determine when to release the handle. That requirement is inconvenient and can result in under flush if releasing the lever handle too soon or over flush if holding the lever handle too long.

U.S. Patent Publication No. US 2002/0133868 A1 to Comparetti shows a water-saving flap valve. It has a bleeder valve in the system. This system can perform a partial flush by tapping the flush handle. The disadvantage for this toilet system is that it is more difficult to control how long a user has to hold the flush handle.

U.S. Patent Publication No. US 2002/0157177 A1 to Sakura discloses a water-saving toilet flushing system. This system uses two tanks and two flap valves flushing system to control the volume of water. This system is expensive to manufacture. It is difficult to retrofit to existing toilet tank.

U.S. Patent Publication No. US 2003/0110555A1 to Tate discloses a dual action toilet flush mechanism. This toilet system has a drain shutter adapted for enabling and disabling the draining device; a water level sensor providing a shutter closer adapted for closing the drain shutter at a selectively adjustable low water level; a device for disabling water filing at a selected high water level; and a lever and chain arrangement for opening the drain shutter thereby enabling draining of the tank. That mechanism needs an operator to hold the flush lever to perform a full flush cycle, which is not convenient to operate. It is also complicated to enable and disable the draining device.

U.S. Patent Publication No. US 2001/0042265 to Han discloses a dual action toilet flush mechanism that can perform the dual flush operations. However, this system is extremely complex. It is expensive to manufacture and difficult to function properly.

U.S. Patent Publication No. US 2002/0148037 to Bellmore, US 2003/0014810 to Jarosinski, and US 2003/0028958 to Hand, and US 2003/0074727 to Hand, disclose a type of dual action toilet flush mechanism that can perform the dual flush operations. This system uses two flush handles and two discharge openings. They also have the low water pressure problem and inflexible to adapt to different toilet tanks.

German Patent No. DE315621 and DE3153688 to Hubatka Alex show a dual flush toilet system. However, this system is complex and expensive to manufacturer and install.

In summary, the previous inventions of the dual flush toilet system employ complicated mechanisms resulting in high cost of manufacturing of the components, difficult to install, or inflexible to retrofit existing toilets. Another major disadvantage of the prior inventions is that the selective flushing system requires a user to hold the flush handle to complete a flushing cycle. Such requirement can result in over flushing or under flushing, which leads to consuming more water. As a result, more water is used because of such ineffectiveness.

SUMMARY OF INVENTION

This invention relates to a dual flush toilet system that provides means of achieving a full or partial flushing operation with current used toilet systems equipped with plunger-shaped flush valves, or hemisphere-shaped flush valves. A flush lever that can activate dual flush operations is also invented to use existing toilet system. Moreover, an electrical mechanical controlled toilet flush system is developed to make the dual flush water saving toilet system simpler and more reliable.

The principle object of this invention is to develop a toilet system with simple mechanisms, cheap to manufacturer, easy to assemble, flexible to retrofit most of the commonly used toilet devices, convenient and reliable to operate, effective to flush the wastes, and efficient to save water. Regardless of the sizes of the toilet tanks, the invented dual flush toilet system can always achieve a full flush operation using 1.6 gallons of water and a partial flush operation using less than 1.6 gallons of water, utilizing the maximum water pressure inside the water tank to maintain the maximum flushing results.

The first part of the embodiments of the invention is for the plunger-shaped flush valve. In the first embodiment, a flush toilet system comprises a toilet tank for holing water, a flush valve, a flush lever, a toilet bowl, an engaging device, and a limit device as well as its variations, and a load device as well as its variations is invented for the adjustable dual flush toilet system.

The activating device is invented to trigger the flush valve to move upwardly or downwardly and rotate about a vertical axis simultaneously. When the flush valve stays in the open position, it permits a selective volume of water to be discharged through the discharge opening and flows into the toilet bowl. Since the volume of water discharged through the water discharge opening depends on how long the flush valve to stay in the open position. The longer the flush valve stays in the open position, the more the water is drained through the discharge opening into the toilet bowl. Therefore, changing the duration of the flush valve staying in the open position leads to changing the amount of water to be used in flushing the toilet. There are two ways to change the duration that the flush valve stays in the open position. One is to adjust the flush valve's maximum vertical travel distance and the other one is to apply an external load on the flush valve to forcibly push the flush valve down sooner to close the discharge opening.

The flush lever comprises a flush handle, a lever arm, and an extension piece. The lever arm and the extension piece are pivotally connected with each other so that extension piece can pivotally rotate about a predetermined angle between the extension piece and the lever arm. With such structure when a user pushes the flush handle down, the flush lever and the extension piece act as one unit to lift the flush valve upwardly and rightwardly. When a user pulls the flush handle up, the extension piece becomes free and rotates about the pivot toward the lever arm. One cable attached on the lever arm pulls the ring of the flush valve upwardly and leftwardly through a cable guide. This flush handle initiates an engagement with either a full flush operation or a partial flush operation for the dual flush toilet system.

The engaging device comprises an engaging protrusion, an engaging member, and a V-shaped groove recessed in the engaging member. The engaging protrusion insertably engaged in the V-shaped groove. The V-shaped groove guides the engaging protrusion to move along with the V-shaped grove. The engaging device is employed to connect the flush valve and a support. The engaging device guides the flush valve to operate in one of the two operation cycles. One operation cycle is moving upwardly and rotating counterclockwise simultaneously, staying open, moving downwardly and rotating clockwise simultaneously, and then dropping down to close the discharge opening and returning to its initial position. The other operation process is moving upwardly and rotating clockwise simultaneously, staying open, moving downwardly and rotating counterclockwise simultaneously and then dropping down to close the discharge opening and returning to its initial position.

The limit device is used for limiting the vertical travel of the flush valve during a flushing operation. The limit device comprises a limit member, a stop member, and adjustable means for adjusting the vertical distance between the limit member and the stop member. If the flush valve travels higher, the longer the flushing lasts. The longer the flushing lasts, the more the water is used to flush the toilet. The limit device can selectively interact with the flush valve. Such selective engagement enables the dual flush system to complete either a full flush operation or a partial flush operation.

The load device is used for applying a downward force on the flush valve to force the flush valve to close down sooner to reduce the amount of water used to flush the toilet. The load device comprises a stop member, load means for applying the load to the flush valve, and adjustable means for adjusting the load to the flush valve or adjusting the time to close the flush valve.

There are several alternative embodiments applying a downward load on the flush valve have been invented. The first embodiment of downward load means employs a preloaded device such as a spring or a weight. When a partial flush cycle is activated, the flush valve engages with the spring and stretches or compresses the spring. Accordingly, the spring applies a downward force to force the flush valve to close down earlier.

Another alternative embodiment of load device employs the weight of the water from the refill tube to the flush valve. A reservoir is affixed to the top portion of the flush valve under the refill tube. When a partial flush operation is activated, the reservoir moves to underneath of the refill tube to fill water. The weight of the water in the reservoir applies a downward force to push the flush valve to close the discharge opening sooner.

Yet another alternative embodiment of load device employs loading means connected to a float chamber in the toilet tank wherein the loading means move upward or downward as the water level in the toilet tank rises or drops. The upward or downward movements of the loading means cause the loading means to apply a load to the flush valve and force the flush valve to close sooner.

Above summarized embodiments serve to the flush valve with combined overflow pipe and float chamber. These embodiments achieve the dual flush operations by applying an extra force to the flush valve, or by limiting the maximum travel of the flush valve, or by forcibly pushing down the flush valve. All the embodiments can be easily adjusted for suiting for various types of water tanks and for controlling the volume of water to flush the toilet according to the flushing tasks.

The invention also describes a flush lever for activating a partial flush or a full flush operation. The flush lever comprises a flush handle, a lever arm, and an extension piece. A flexible means is attached on the lever arm. When a user pushes down the flush handle, the flush lever activates a partial flush operation. When a user pulls up the flush handle, the flush lever activates a full flush operation.

A manual flush activating device is mounted on the toilet tank cover generally placed on the top opening of the toilet tank. This manual flush activating device comprises two push rods, two springs, flexible means which have one end connected to the flush valve and the other end connected to the push rods, and plurality of guides for altering the directions of flexible means. When a user pushes either the full flush rod or a partial flush rod, the flush valve is lifted up by the flush activating mechanism. The flush valve is then in an open position to permit the water to flow into the toilet bowl to flush the waste. As the water level drops down further, the suction force form the discharge opening pulls the flush valve downward to seal the discharge opening. By employing one flush rod for activating either a full flushing operation or a partial flushing operation, alternative embodiments for the manual flush activating embodiments are also developed. This manual activating device comprises a rod with a pivot in the middle portion and a spring horizontally placed with one end against the push rod and the other end against an unmoving surface of a support. Two flexible means are used for connecting to the flush rod and the flush valve. By pulling the flush rod leftwardly or rightwardly and then release it, the flush rod activates the flush valve to perform a full flushing operation or a partial flushing operation. Yet another alternative embodiment of the manual flush embodiment is to employ one push pad for the dual flushing operations. This manual flushing device comprises a T-shaped push pad, two springs, two flexible means each of which has one end connected to the flush valve and the other end connected to the push rod, and guide means for altering the directions of flexible means.

Another embodiment of this invention for a dual flush toilet is to use an electronic controlled device to operate the flush valve and regulate the volume of water to flush the toilet. The electronic controlled device comprises a flush valve with a tubular body and a horizontal flange on the bottom. The bottom surface of the horizontal flange covers and seals the discharge opening. The tubular body of the flush valve is slidably axially engaged with a spud, which is secured on the grits of the discharge opening. Two push buttons are coupled with two switches that are part of the elements of a control circuit. The switches can be switched on or off to control an electrical mechanical driver that is connected to the top portion of the flush valve. When a user pushes the first push button, the electrical drive is activated and pulls the flush valve upwardly and holds the flush valve in the open position for certain period of time to permit the water inside the water tank to flow into the toilet bowl to flush the waste. The electronic control system can automatically control the flushing time. When the circuit is turned off, the flush valve returns to its home position by a spring mounted between a shoulder on the flush valve and the bottom surface of the water tank cover or by the gravity of the flush valve. When a user pushes the second flush button, the flush operation process is similar to the full flushing operation. However, the duration of the flush valve staying open is shorter than the full flushing operation. As a result, a smaller volume of water is used in the partial flushing operation.

In this invention an embodiment of dual flush toilet system is developed for a hemisphere-shaped flapper valve. This flapper valve has a float member with a horizontal axis above the float member. A frame with one end pivotally connected to a support and the other end pivotally connected to the axis of the float member. The dual flush process is achieved by having at least one hole on the lower portion of the flapper valve. The flapper valve can rotate about a primarily horizontal axis located generally above the flapper valve and pivotally engaged with the far end of the frame. Two or more holes on the flapper valve can also be employed to perform the dual flush operations. With one hole on the flapper valve, the lower portion of the hole is used as a passage for the water to enter into the chamber of the flapper valve. The upper portion of the hole is used as a passage for the air inside the chamber of the flapper valve to escape. With two holes on the flapper valve, the lower hole is used as a passage for the water to enter into the chamber of the flapper valve. The upper hole is used as a passage for the air inside the chamber of the flapper valve to escape. When the flush valve is lifted, it is submerged in the water. Because of the water pressure, the air inside the chamber escapes from the chamber and the water form the water tank enters the chamber. As the water displaces the air inside the chamber, the buoyancy of the flapper valve becomes smaller and smaller. When the buoyancy of the flapper valve is smaller than the gravity of the flapper valve, the flapper valve drops down and closes the discharge opening. Under the conventional room temperature and operation condition, the air escapes from the same size hole under the same pressure faster than the water does because of the different viscosities between air and water. Water is heavier than air; water has greater viscosity than that of air. The time that is needed for the water to enter the chamber can be adjusted by changing the shape, the location, and the relative elevations of the hole on the valve when the valve rotates to certain direction. Therefore, when the flush valve is lifted, the duration for the flapper valve to stay in the open position responding to rotating about a horizontal axis to one direction is different from the duration for the flapper vale to stay in the open position responding to rotating about a horizontal axis to the opposite direction. An adjustment device can be placed next to the surface of the hole to adjust the net size of the aperture to change the timing of the flapper valve to stay in the open position. This adjustment piece can be used to accommodate different sizes of toilet water tank and different sizes of discharge openings. The structure of this flapper valve can precisely control the volume of water to flush the toilet. This embodiment is easy to manufacture and flexible to retrofit to all types of toilet tanks.

BRIEF DESCRIPTION OF DRAWINGS

FIG. 1M is a view of another alternative embodiment of dual flush toilet system with a travel limit device.

FIG. 1N is a detailed section view of the travel limit device in FIG. 1M taken along line 1N—1N.

FIG. 2 is a view of the dual flush system operations.

FIG. 4A is a view of another embodiment of the dual flush system with a load device.

FIG. 4B is a side view taken along line 4B—4B of the dual flush view system shown in FIG. 4A.

FIG. 4C is a top view taken along line 4C—4C of the dual flush system shown in FIG. 4A.

FIG. 4D is another alternative embodiment of the dual flush toilet system with a load device.

FIG. 4E is a top view of the dual flush toilet system with the load device in FIG. 4D.

FIG. 4F is a top view showing an alternative embodiment of a load device.

FIG. 11A is a view of the embodiment of a dual flush toilet system with a flapper valve.

FIG. 11B is a side view of the dual flush toilet system taken along line 11B—11B shown in FIG. 11A.

FIG. 11C is a view of the flapper valve in a full flush operation for the dual flush toilet system shown in FIG. 11B.

FIG. 11D is a view of the flapper valve in a partial flush operation for the dual flush toilet system shown in FIG. 11B.

DETAILED DESCRIPTION

Reference is made to the drawings for a description of the preferred embodiments of the present invention wherein like reference numbers represent like elements in corresponding views.

Figure 1A:
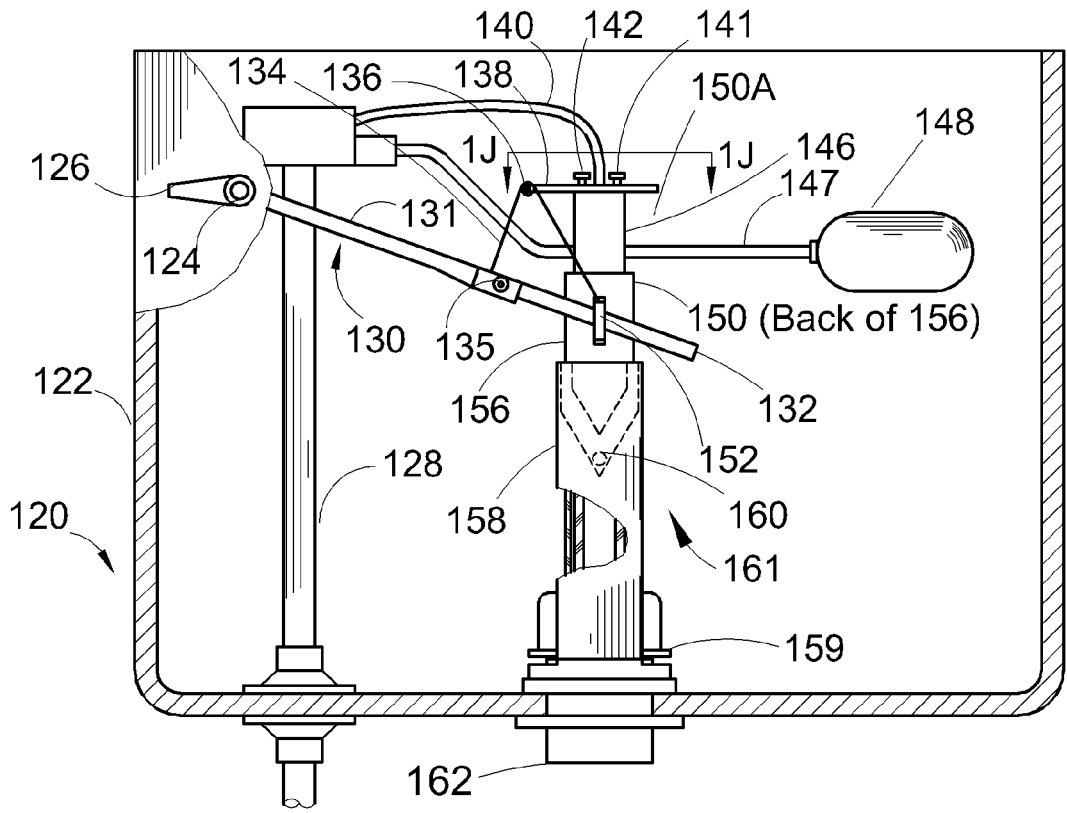
FIG. 1A is a schematic front section view of the dual flush toilet system with an engaging device in the front, a travel limit device at the top, and a dual flush lever in front of the flush valve from present invention.

Referring now to FIG. 1A, it is a front view of the first embodiment of a dual flush toilet system 120. This invention of the dual flush toilet system 120 comprises a toilet water tank 122 with a discharge opening 159 on the bottom, a toilet bowl (not shown) located below the toilet tank 122, a flush valve 156 with an upstanding elongated tubular body rising above the water level which can move upwardly and rotate about a vertical axis for selectively performing a full flush operation or a partial flush operation, a spud 146 for supporting the flush valve 156, a flush lever 130 for activating a full flush or a partial flush operation, a float 148 for controlling the water inlet valve and refilling the water to the toilet water tank 122 of the dual flush toilet system 120. A water discharge opening 159 is located at the bottom of the toilet water tank 122 connected to the toilet bowl for the water in the toilet water tank 122 to discharge into the toilet bowl via a draining passage 162 to flush the wastes. A float 148 is connected through a float arm 147 to the inlet valve mounted on a water refill pipe 128 for maintaining the water level inside the toilet water tank 122 to a predetermined level after each flushing of the toilet system. The float 148 can be employed to apply a downward load to the flush valve 156 to forcibly close the discharge opening 159. An engaging device 161 is employed for enabling the flush valve 156 to move upwardly or downwardly and simultaneously rotates about a vertical axis of the spud 146, A first limit device 141 is employed for adjusting the upward traveling height of the flush valve 156 when the toilet system 120 performs a full flush operation and a second limit device 142 is employed for adjusting the upward traveling height of the flush valve 156 when the toilet system 120 performs a partial flush operation.

The dual flush toilet system 120 incorporates the spud 146 that is demountably secured to the bottom of the toilet water tank 122 as shown in FIG. 1A. The spud 146 has a tubular body having a lower end being secured to the discharge opening 159. The spud 146 provides support to the flush valve 156 and a top member 138 and guides the movement of the flush valve 156 through a cable guide 136. The top member 138 mounted on top of the spud 146 accommodates one end of a refill tube 140 into the spud. The other end of the refill tube 140 is connected to the refill tube 128.

Figures 1B, 1C, 1D:
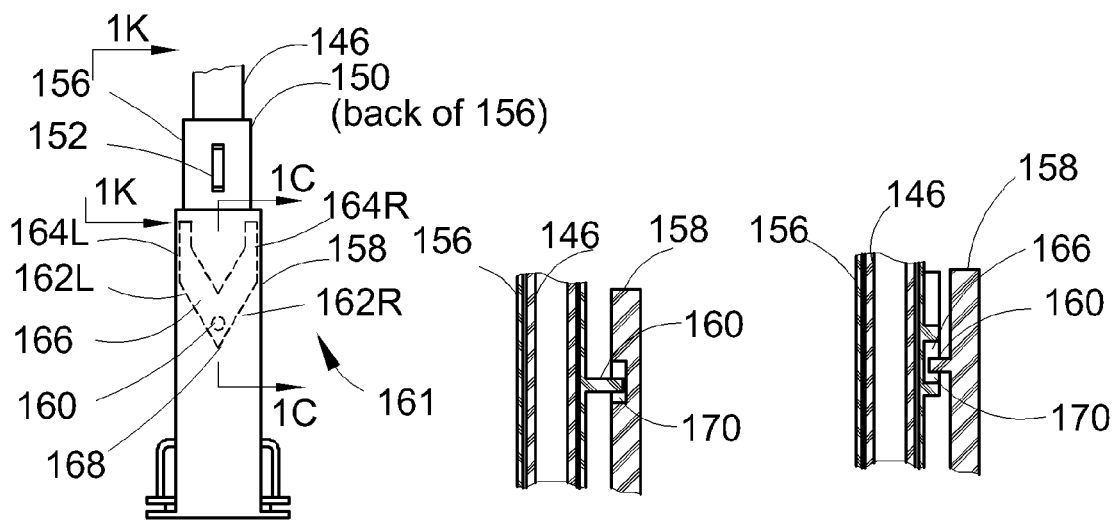
FIG. 1B is a front view of the dual flush valve, the engaging device, and the spud.
FIG. 1C is a section view showing the engagement between the dual flush valve and the engaging device taken along line 1C—1C in FIG. 1B.
FIG. 1D is a section view showing an alternative embodiment of the engagement between the dual flush valve and the engaging device.
Figure 1E:
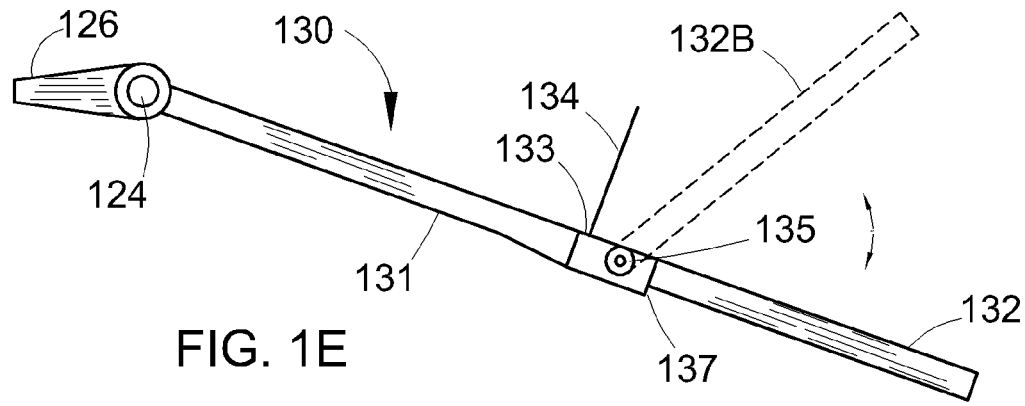
FIG. 1E is a front view of the flush lever with a pivotal connection and flexible means connection.
Figure 1F:
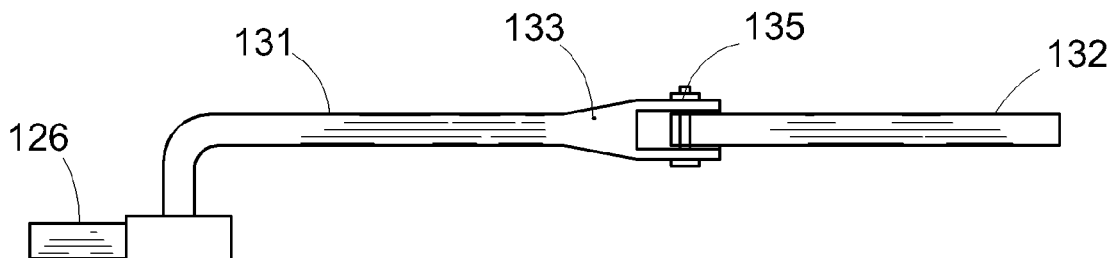
FIG. 1F is a top view of the flush lever.

The flush valve 156, with a float chamber at the bottom and a tubular body on upper portion, can slidably engage with the body of the spud 146 upwardly or downwardly and in rotating about a vertical axis. The engaging device 161 is employed to guide the movement of the flush valve 156. An engaging protrusion 160 of the engaging device 161 as shown in FIG. 1B is connected to the flush valve and is receivablly and slidably engaged with the V-shaped groove 166 of the engaging member 158 of the engaging device 161. A ring 152 is affixed generally on the top portion of the flush valve 156. The flush lever 130, which is slidably engaged with the ring 152 as shown in FIG. 1L, has an extension piece 132 through the opening of the ring 152. The flush lever 130 has a flush handle 126 located on top outside the water tank 122 through a lever pivot 124. One end of a flexible cable 134 is attached to the attaching point 133 of the lever arm 131 near the pivot 135, as shown in FIGS. 1E and 1F, and the other end is connected to the ring 152. On the upper portion of the flush valve 156 a stop member 150 extends radially outwardly on the cylindrical surface of the flush valve 156 and moves together with the flush valve 156. When the flush valve 156 moves up, the stop member 150 also moves up and contacts with either a first limit device 141 or a second limit device 142 according to the waste in the toilet bowl. The top member 138 is demountably secured on the top portion of the spud 146. Both the first limit device 141 and the second limit device 142 can be adjusted to limit the travel of the flush valve 156. The purpose to permit the flush valve 156 to have such upright travel limits is to make the flush valve 156 close the discharge opening 159 sooner to use a smaller volume of water to flush the liquid waste, or close later to use a larger volume of water to flush the solid waste, regardless of the shape of the toilet water tank 122. The higher the flush valve 156 travels upward, the longer the flush valve stays open because the flush valve is pulled by the downward suction force from the discharge opening 159 when the flush valve 156 is lowered enough to close the discharge opening 159. The longer the flush valve 156 stays open, the larger the volume of water to be used to flush the toilet. As a result, controlling the flush valve 156's vertical travel generally regulates the volume of water to be used to flush the toilet bowl. Now referring to FIG. 1G and FIG. 1J, to achieve quality flushing of the waste and retrofit various toilet tanks from different manufacturers, the first limit device 141 is employed to restrict the flush valve 156's travel for a full flush operation and the second limit device 142 for adjusting the flush valve 156's travel in a partial flush operation. The first limit device 141 and the second limit device 142 can be threaded studs that can be adjusted with the threaded hole on the top member 138. The first limit devices 141 and the second limit device 142 can also employ a setscrew on the top member 138 to adjust the first limit devices 141 and the second limit device 142 to different positions. When the flush valve 156 moves up and rotates counterclockwise about a veridical axis, the stop member 150 moves under the first limit member 141 and then is stopped by the first limit device 141. When the flush valve 156 moves up and rotates clockwise about a veridical axis, the stop member 150 moves under the second limit member 142 and then is stopped by the second limit device 142. The first limit device 141 and the second limit device 142 can be independently adjusted to limit the maximum upward travel of the stop member 150. It has been noted that similar adjusting mechanisms that are widely used in industries can be also applied in this situation. The maximum travel can be adjusted according to the volume of water required to complete the flushing and accommodated to the characteristics of the various types of toilet systems.

As shown in FIG. 1A, the water refill tube 140 has one end inserted through a hole in the top member 138 and the other end connected to the water refill pipe 128. The refill tube 140 is used to fill a small amount of water into the toilet bowl after each flushing operation. A cable guide 136, which permits a cable 134 to slide through the loop of the cable guide 136 and alter the direction of the movement of the cable 134, is secured on the top member 138. The cable guide 136 coordinates the cable 134 to pass through the loop of the cable guide 136, with one end connecting to the cable 134 to the lever arm 131 and the other end to the top of the ring 152 as shown in FIG. 1A. It is noted that the flexible cable 134 can be replaced by other flexible means such as chains, lines, cords, or any other flexible or bendable elements used in industries.

The valve engaging device 161 is shown in FIGS. 1B, 1C, 1D, 1H, and 1I. The valve engaging device 161 has an engaging member 158 in which a V-shaped groove 166 is recessed on the inner surface of the engaging member 158 and is receivablly, insertably, and slidably engaged with the engaging protrusion 160. The V-shaped groove 166 has two branches 162L and 162R. The left branch 162L extended from the vertex 168 of the V-shaped groove 166 leftwardly and upwardly to its upper portion 164L. The right branch 162R extends rightwardly and upwardly to its upper portion 164R. The engaging member 158 has an inner surface parallel to the outer surface of the flush valve 156. The valve engaging member 158 is mounted on the base of the spud 146 in this embodiment. However, valve engaging member 158 can be affixed to any unmoving part in the toilet system. The engaging protrusion 160 is attached on the outer surface of the flush valve 156 with portion of the body of protrusion 160 is insertably extended into the recessed groove of the V-shaped groove 166 and can be slidably engaged with the V-shaped groove 166. The V-shaped groove 166 limits the engaging protrusion 160 to move along either of the two branches 162L and 162R. When the flush valve 156 is in a close position it seats against the flange of the water discharge opening 159. The engaging protrusion 160 is above the vertex 168 of the V-shaped groove 166. There is a small gap 170 as shown in FIGS. 1C and 1D between the bottom of the engaging protrusion 160 and the vertex 168 of the groove 166 to assure that the engaging protrusion 160 has no interference with the closing of the discharge opening 159. This small gap is also needed to assure that the flush valve firmly seats on the flange of the discharge opening 159 and prevent the water from leaking into the toilet bowl when not in use.

FIG. 1C is a cross-section view that shows the engagement of the engaging protrusion 160 on the flush valve 156 with the V-shaped groove 166 of the engaging member 158. An alternative embodiment for the valve engaging device 161 is to place the V-shaped groove 166 on the flush valve and the engaging protrusion 160 on the guide member 156 as shown in FIG. 1D. The V-shaped groove 166 turns upside down with the vertex 168 on the top and the branches below it. Similarly, the V-shaped groove 166 and the engaging protrusion 160 can also be placed on the flush valve 156 and the spud 146 as shown in FIGS. 1H and 1I. The V-shaped groove 166 is employed to ensure that when the flush valve 156 is activated to initiate both an upward movement and a simultaneously rotation clockwise if the flush valve is engaged in the left branch of the groove 162L, or counterclockwise if the flush valve is engaged in the right branch 162R of the V-shaped groove 166. The upwardly counterclockwise rotational movement of the flush valve 156 permits the stop member 150 to have a movement guided by the path of the branch 162R and 164R until the second limit device 142 stops the travel stop member 150 and prevent it from moving up farther. The upwardly clockwise rotational movement of the flush valve 156 permits the stop member 150 to have a movement guided by the path of the left branch 162L and 164L until the first limit device 141 stops the stop member 150 and prevent it from moving up farther.

FIGS. 1E and 1F show the embodiment of the flush lever 130 of the invention for the dual flush toilet system. The flush lever 130 has a flush handle 126 for a user to activate a full flush operation or a partial flush operation, the lever arm 131 for activating the cable 134, the extension piece 132 for activating the ring 152, a lever pivot 124 with a generally horizontal axis, and an arm pivot 135 with a generally horizontal axis for the extension piece 132 to rotate about the arm pivot 135 within a predetermined angle. In this invention, the flush lever arm 131 and the extension piece 132 are pivotally connected at one end of the lever arm 131 within a slot received at one end of the lever arm 131. The extension piece 132 can only rotate within a predetermined angle towards the lever arm 131 and are not permitted to rotate beyond this predetermined angle to the position 132B. As shown in FIG. 1E the bottom edge of the slot at the edge 137 of the lever arm 131 is extended under the extension piece 132 and against the bottom surface of the extension piece 132. The edge 137 of the slot at the end of the lever arm 131 prevents the extension piece 132 from rotating beyond the predetermined angle. When the flush handle 126 rotates counterclockwise, the lever arm 131 and the extension piece 132 move as one piece because the edge 137 of the slot of the lever arm 131 prevents the extension piece 132 from rotating beyond the predetermined angle. As a result, the extension piece 132 pushes the ring 152 upwardly and rightwardly to lift the flush valve 156. In this situation the cable 134 is slacked as indicated in 134A in FIG. 1G. When a user pulls up the flush handle 126, the lever arm 131 rotates clockwise and the extension piece 132 can freely rotates about the arm pivot 135 to 132B and cannot take effect on the ring 152. As a result, the lever arm 131 pulls the cable 134 downward. The cable 134 will pulls the ring 152 upwardly and leftwardly to activate the flush valve 156 in a full flush operation as shown in FIG. 1E.

Figure 1G:
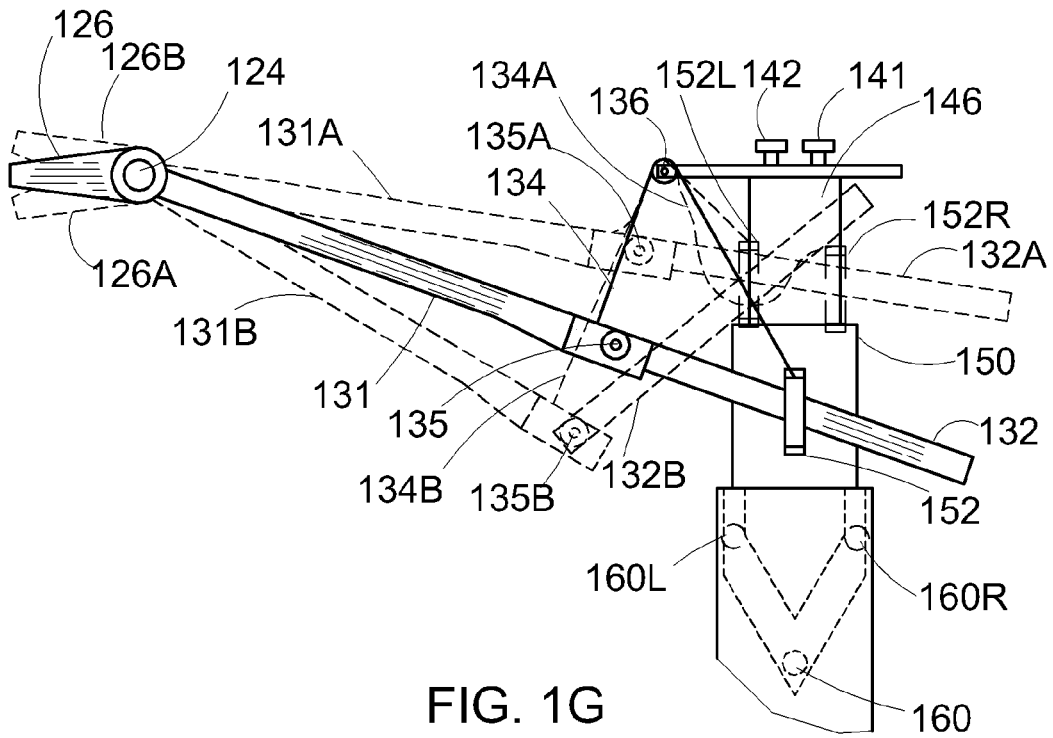
FIG. 1G is a view to show the dual flush operations according to present invention.
Figure 1H:
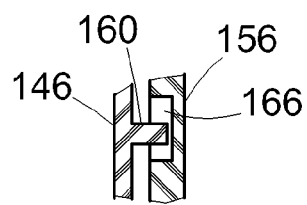
FIG. 1H is a view of another alternative embodiment of the engagement between the flush valve and the engaging device.
Figure 1I:
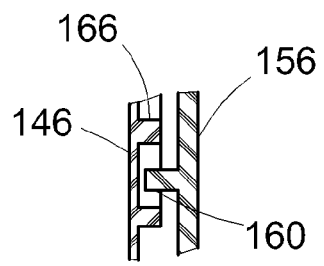
FIG. 1I is a view of another alternative embodiment of the engagement between the flush valve and the engaging device.
Figure 1J:
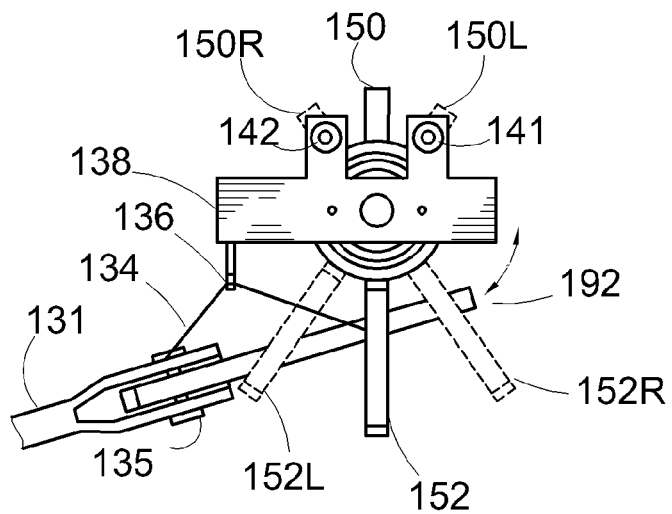
FIG. 1J is a top view of the flush valve, taken along line 1J—1J with a travel limit device in the back of the flush valve.

FIG. 1G illustrates the operations of the lever arm 131. According to the types of wastes to be flushed in the toilet bowl, a user can decide to have a full flush operation by pulling up the flush handle 126 to position 126B or a partial flush operation by pushing down the flush handle 126 to position 126A. When the dual flush toilet is not used, the flush valve seats on the flange of the water discharge opening 159 as shown in FIG. 1A. When the flush handle 126 is pulled up and turned in position 126B, the lever arm 131 rotates clockwise around the lever pivot 124. Since the cable 134 is connected to the far end of the lever arm 131 at the attaching point 133, the flush lever body will rotate about the lever pivot 124 and the cable 134 will pull the ring 152 to position 152L through the cable guide 136. The cable will be stretched as indicated in 134B. Now referring FIGS. 1G, 1J and 2, as the ring 152 is lifted ad move to the position 152L, the flush valve 156 moves upwardly and rotates clockwise about a vertical axis simultaneously as shown in FIG. 1J because the engaging device 161 only permits the flush valve 156 to move and rotate along the V-shaped groove 166 as described above. Accordingly, the stop member 150 moves upwardly and clockwise to position 150L until the first limit device 141 stops the stop member 150. During this process the extension piece 132 becomes loosely held in the ring 152 and can be freely rotate about the arm pivot 135. Hence it has not effect on the flush valve 156's movement. As shown in FIG. 1B the engaging protrusion 160 of the engaging device 161 moves along the left branch 162L of the V-shaped groove 166 to the upper position 164L. The protrusion 160 moves to the position 160L. The flush valve 156 is in open position because the buoyancy from the air trapped in the chamber of the flush valve 156 lifts the flush valve 156 up. The first limit device 141 stops the stop member 150. As the flush valve 156 remains in open position, the water from the toilet water tank 122 discharges though the discharge opening 159 into the toilet bowl to flush the waste. As the water level drops, the buoyancy from the chamber of the flush valve 156 becomes smaller. When the total downward force from the suction force of the discharge opening 159, the reaction force from the first limit device 141, and the gravity of the flush valve 156 becomes greater than the buoyancy of the flush valve 156, the flush valve 156 drops downward and rotates counterclockwise about a vertical axis simultaneously closing the discharge opening 159. The engaging protrusion 160 returns to its initial position. This process completes a full flush operation.

Similarly, the partial flush operation can be performed in the same process. When the flush handle 126 is pushed down and turned to position 126A as shown in FIG. 1A, the lever arm 131 rotates counterclockwise about the lever pivot 124. In this situation the cable 134 is slacked as indicated in 134A and does not have effect on the control of the movement of the flush valve 156. The extension piece 132, under the restriction of rotation beyond the predetermined angle, is driven by the lever arm 131 and push against the upper inner edge of the ring 152. The extension piece 132 moves to position 132A and lifts the ring 152 upwardly leftwardly to position 152R as shown in FIG. 1G. Now referring FIGS. 1G, 1J, and 2, as the ring 152 is lifted, the flush valve 156 moves upwardly and rotates counterclockwise about a vertical axis simultaneously because the engaging device 161 only permits the flush valve 156 to move and rotate along the V-shaped groove 166 as described previously. Accordingly, the travel stop member 150 moves upwardly and rotates counterclockwise to position 150R until the second limit device 142 stops the stop member 150. During this process the extension piece 132 activates the movement of the ring 152. As shown in FIGS. 1B and 2, the engaging protrusion 160 moves along the right branch 162R of the V-shaped groove 166 then to the right upper branch 164R. The protrusion 160 moves to the position 160R. The flush valve 156 is in open position because the buoyancy from the air trapped in the chamber of the flush valve 156 lifts the flush valve 156 upwardly and rightwardly until the second limit device 142 stops the stop member 150. As the flush valve 156 remains in open position, the water from the toilet water tank 122 discharges though the discharge opening 159 into the toilet bowl to flush the waste. As the water level drops, the buoyancy of the chamber of the flush valve 156 becomes smaller. When the total downward force from the suction force from the discharge opening 159, the reaction force from the second limit device 142, and the downward gravity of the flush valve 156 becomes greater than the buoyancy of the flush valve 156, the flush valve 156 drops downward and rotates clockwise simultaneously to close the discharge opening 159. The engaging protrusion 160 returns to its initial position. This cycle completes a partial flush operation. In this invention, the stop member 150 can be attached to the surface of the flush valve 156 with minimum modification. It is understandable that the first limit device 141 and the second limit device 142 are interchangeable and they can employ the same mechanism as long as they perform the control of the timing of flushing described above by stopping the stop member 150 at different positions.

Figure 1K:
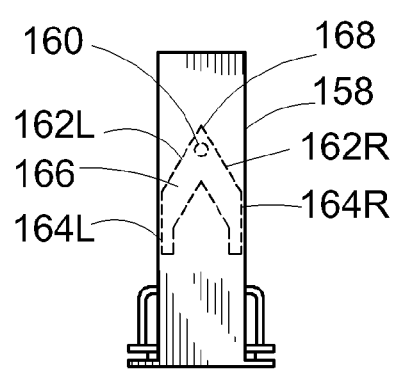
FIG. 1K is a view of alternate embodiment of the engagement between the flush valve and the engaging device taken along line 1K—1K in FIG. 1B.
Figure 1L:
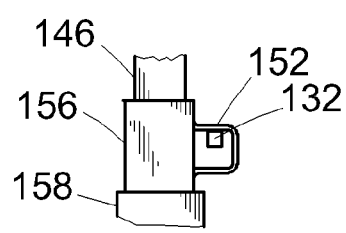
FIG. 1L is a view showing the ring attached to the flush valve and the flush lever engaged with the ring.

For the same reason the engaging device 161 can have similar embodiments as long as the flush valve is engaged in a rotation about a vertical axis simultaneously. FIG. 1H shows a similar valve engaging mechanism between the flush valve 156 and the spud 146 where the engaging protrusion 160 is affixed on the spud 146 and the V-shaped groove 166 is affixed on the flush valve 156. FIG. 1I shows the engaging protrusion 160 is affixed on the flush valve 156 and the V-shaped groove 166 is affixed on the spud 146. These alternative embodiments can be implemented by inversing the V-shaped groove upside down shown in FIG. 1K.

FIGS. 1M and 1N disclose another alternative embodiment of the first limit device 181 and the second limit device 182 located in the upper portion of the branches 164L and 164R of the V-shaped groove 166. Both the first limit device 181 and the second limit device 182 are the same. The only difference is their locations in the upper branches 164L and 164R of the V-shaped groove 166. The first limit device 181 is mounted at a higher elevation than the second limit device 182 as described in previous embodiment. FIG. 1N shows the cross sectional view of the second limit device 182. A slot 186 is cut through the wall of the upper portion of the branch 164R of the V-shaped groove 166 located in the engaging member 158. The slot 186 has an opening with the width smaller than the width of the groove and with the elongated side aligned with the orientation of the right branch 164R of the V-shaped groove 166. A screw 183 has a head portion with the diameter larger than the width of the slot 186 and a threaded body portion with a diameter smaller than the opening of the slot 186 and a length longer than the thickness of the wall of the branch 164R of the V-shaped groove 166. The screw 183 is assembled into the branch 164R by pushing its body through the slot 186 with the head of the screw 183 against the bottom surface of the V-shaped groove 166 and with the end of the body is screwably engaged with a nut 184. The location of the screw 183 can be easily adjusted by loosing the nut 184 and them moving the screw 183 upward to 186B or downward to 186A and then tighten the nut 184 to secure the screw 183 in a desired position. The adjustment of the screw 183 permits the flush valve 156 to move to a different position to accommodate different sizes of toilet tanks with constant volume of water used to flush the toilet. Because the head of the screw 183 is located in the middle of the right branch 164R, the head of the screw 183 stops the engaging protrusion 160 and prevents it from moving up beyond the head of the screw 183. In order to permit more water in the toilet water tank 122 to flow though the discharge opening 159 to flush the waste, the screw 183 of the second limit device 182 can be set toward 186B direction to increase the volume of water to flush or toward 186A direction to reduce the volume of water to flush the waste. The operation of the flush is similar to the operation process described in previous embodiments.

Figure 3A:
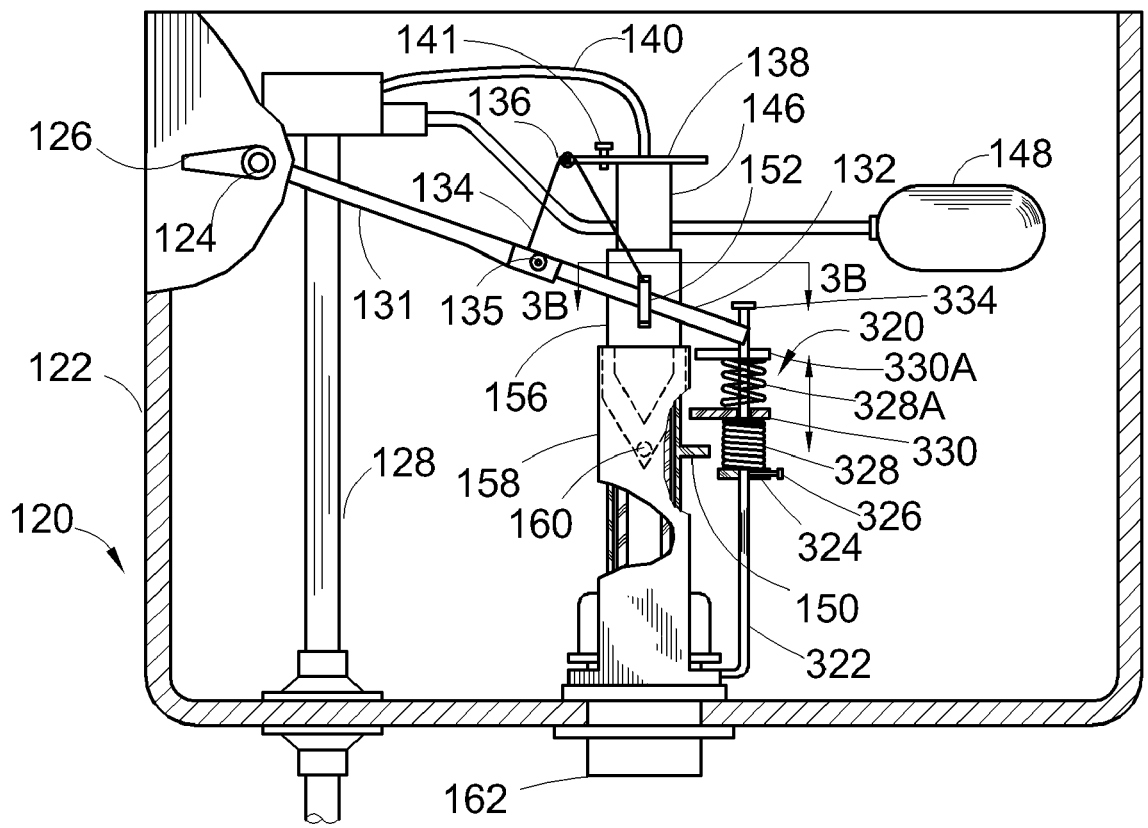
FIG. 3A is a view showing another embodiment of the dual flush toilet system with a load device.
Figure 3B:
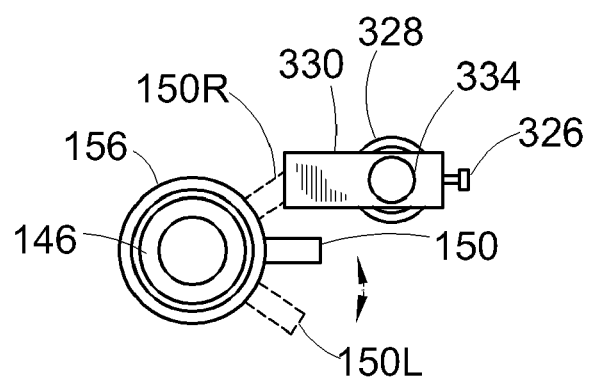
FIG. 3B is a top view taken along line 3B—3B of the dual flush toilet system showing in FIG. 3A.

Another alternative embodiment of the toilet flush adjustment mechanism in this invention is disclosed in FIGS. 3A and 3B. In this embodiment, a load device 320 is provided for selectively applying a downward force to the flush valve 156. The purpose to have this additional downward force to the flush valve 156 is to add an additional downward load to the flush valve 156 to close the discharge opening 156 sooner. The sooner the flush valve closes; the smaller volume of water is used to flush the toilet. The load device 320 comprises a support member 322, a bottom plate 324 with an adjustment element 326, a spring 328, a top plate 330, and a stop member 334. The support member 322 has an L-shaped body with bottom portion mounted on the base of the spud 146 and a straight elongated uniform cross-sectional body portion standing upright accessible to the flush valve 156. In the middle portion of the support member 322 there is an adjustable bottom plate 324 with a hole in the middle slidably engaged with the body of the support member 322 and with another threaded hole radially cut through its outer cylindrical circumference extending to the center hole so the adjustable element 326 can screw into the threaded hole with the end of the adjustable element 326 pressing against the surface of the body of the support member 322. The adjustable element 326 can be used to adjust the position of the bottom plate 324 along any straight position of the L-shaped support member 322. The lower end of the spring 328 is affixed to the bottom plate 324. The upper end of the spring 328 is affixed to the top plate 330. The top plate 330 has a hole in which the support member 322 slides into the hole so the top plate 330 can slidably move upwardly or downwardly along the support member 322. The left side of the top plate 330 extends horizontally beyond the outmost diameter of the spring 328 and above the engaging protrusion 160. The stop member 334 is secured on top end of the support member 322 for restricting the top plate 330.

To perform a partial flush operation, a user pushes the flush handle 126. The lever arm 131 rotates counterclockwise. The extension piece 132 pushes the ring 152 upwardly and rightwardly simultaneously. As a result of the upward rightward movement of the extension piece 132, the cable 134 slacks and has no effect on the operation of the flush valve 156. The engaging protrusion 160 on the flush valve 156 slidably engages in the right lower branch 162R and then 164R. Hence, the flush valve 156 engages with the right branch of the V-shaped groove 166 and moves up. In the meantime the stop member 150 moves to position 150R below the top plate 330 as shown in FIG. 3B. As the flush valve 156 continues to move up, the stop member 150 contacts the top plate 330 then pushes the top plate 330 upwardly. As the top plate 330 moves up, it stretches the spring 328. Accordingly, the stretched spring 328 applies a downward force to the stop member 150. Because of the extra force applied to the flush valve 156 by the stretched spring 328, the flush valve 156 can only travel up to a position lower than the position if there is no interference between the stop member 150 and the top plate 330. As a result, the flush valve 156 shuts down the flushing sooner and the volume of the water from the toilet water tank 122 flows into the toilet bowl is smaller. When the total force form the weight of the flush valve 156 itself, the and the downward force from the spring 328, and the suction force from the discharge opening 159 is greater than the buoyancy of the float of the flush valve 156, the flush valve 156 moves downward. Because the engaging protrusion 160 is slidably engaged with the right branch of the V-shaped groove 166, the engaging protrusion 160 guides the flush valve 156 to move downwardly and rotate clockwise. When the bottom of the flush valve 156 seals the discharge opening 159 the engaging protrusion 160 stays slightly above the groove vertex 168. The flush valve 156 returns to its initial position. The stop member 150 disengages with the top plate 330 when the stop member 150 moves below the initial position of the top plate 330.

As shown in FIG. 3B, if a full flush operation is performed, the lever arm 131 rotates clockwise and pulls down the end of the cable 134 attached to the far end of lever arm 131. The other end of the cable 134 pulls the ring 152 leftwardly and upwardly leading the engaging protrusion 160 to engage the left branch 162L of the V-shaped groove 166. As a result of such movement, the stop member 150 moves upwardly and rotate clockwise simultaneously to the position 150L. In this situation the stop member 150 will not engage with the load device 320. The flush valve 156 performs a full flush operation. The flushing process has been described in previous embodiments. The volume of water for a partial flush can be incrementally adjusted by loosing the setscrew of the adjustment element 326 and then move the bottom plate 324 higher or lower along the body of support member 322. Generally, lowering the bottom plate 324 results in more stretch of the spring 328 and a greater downward force applied to the stop member 150. This serves as less water consumed in the partial flush process. Similarly, if the top plate 330 is set at a higher level, a larger volume of water will be consumed in a flush operation.

Another alternative embodiment of the load device 320 is implemented by inversing the position of the top plate 330 and the bottom plate 324. The bottom plate 324 is placed on upper and the top plate is placed under the bottom plate 324. The spring 328 becomes a compressed spring when stop member 150 engages with the top plate 330. The spring 328 applies a downward force to the flush valve 156 to make the flush valve 156 close sooner. As a result, a smaller volume of water is used in the flushing process.

FIG. 4A shows another alternative embodiment of the load device 420 for controlling the time to keep the flush valve 156 open by applying a downward load to the flush valve 156. As shown in FIGS. 4B and 4C the load device 420 comprises a support member 426 with an L-shaped body with the first end adjustably mounted on a generally horizontal oriented float arm 147 by two setscrews 425 pressing against the removable lower half cover 427 and the second end cantileverally hanging toward the flush valve 156, a second adjustable member 424 screwably mounted approximately at the second end of the support member 426 with a threaded hole on the support member 426, and a load plate 422 mounted on the lower end of the second adjustable member 424. The float arm 147 is connected to the toilet tank float 148 which moves up as the water level rises when water flows into the toilet water tank 122, or drops down as the water level lowers as the water from the toilet water tank 122 discharges into the toilet bowl to flush the waste. When a user pushes down the flush handle 126, the extension piece 132 of the flush lever 130 pushes the ring 152 upwardly and rightwardly. The upward and rightward movement enables the engaging protrusion 160 to engage in the right branch 162R of the V-shaped groove 166 as shown in FIGS. 1B and 1G. The stop member 150 also moves both upwardly and rotates counterclockwise. As a result of such movement, the stop member 150 rotates from its initial position to position 150R and under the load plate 422 as shown in FIG. 4C. As the flush valve 156 moves up, it opens the discharge opening 159. The water in the toilet water tank 122 flows through the discharge opening 159 into the toilet bowl to flush the waste. As the water in the toilet water tank 122 drains through the discharge opening 159, the water level inside the toilet tank drops accordingly. As the water level in the toilet water tank 122 drops, the float 148 and the float arm 147 drop accordingly. The load plate 422 mounted on the support member 426 of the load device 420, as shown in FIGS. 4B and 4C, moves downward at position 422A and contacts the upper surface of the stop member 150. As the water level in the toilet water tank 122 lowers further, the load plate 422 applies a downward force on the stop member 150 and forcibly pushes the flush valve 156 downward. Guided by the engaging protrusion 160 and restricted by the right branch 162R and 164R of the V-shaped groove 166, the flush valve 156 moves downward and rotates clockwise to close the discharge opening 159 and complete the partial flush operation. When the discharge opening 159 is closed, the water inlet valve that is not shown is open and the water from the inlet pipe 128 refills the toilet water tank 122. As the water level rises, the float 148 rises accordingly. The load device 420 mounted on the float arm 147 returns to its initial position. The full flush operation is similar to the partial flush operation described above. From FIG. 4C the stop member 150 moves to the location 150L as the ring 152 moves to location 152L. Since there is no interaction between the engaging protrusion 160 and the stop member 150, there is no extra load applying to the flush valve 156. The flush valve performs a full flush operation.

Another alternative embodiment of the load device 420 is illustrated in FIG. 4F, wherein there are two adjustable members: a first adjustable member 423 and the second adjustable member 424 mounted on the support member 426 of the load device 420. The first adjustable member 423 is vertically screwably mounted approximately on the right side of the second end of the support member 426 and the second adjustable member 424 is vertically screwably mounted approximately on the left side of the second end of the support member 426. In this embodiment, the load plate 422 is taken off so the first adjustable member 423 and the second adjustable member 424 are directly placed above the full flush position 150L and the partial flush position 150R of the stop member 150. The first adjustable member 423 and the second adjustable member 424 can be independently adjusted to set at different heights so the load device 420 can forcibly push the flush valve 156 down to close the discharge opening 159. Raising the lower end of the adjustable members 423 or 424 allows the load device 420 to close the flush valve later so that a large volume of water is used in flushing the toilet. Similarly, lowering the lower end of the adjustable members 423 or 424 allows the load device 420 to close the flush valve 156 sooner. Hence the smaller volume of water is used in flushing the toilet.

The same load device 420 can also be applied to a vertical mounted float 440 which is slidably mounted on the water refill pipe 128 with a guide element 444 to prevent the load device 420 from rotating about the vertical axis of the refill pipe 128 as shown in FIGS. 4D and 4E. The first end of the support member 450 is securely mounted on the vertical float 440 that is vertically and movably mounted on the water inlet pipe. The operation is the same as the operations of the embodiment as described in previous paragraphs.

Generally, in this invention the dual flush operation process can be described as following: first, activating the flush valve 156 in the water tank 122 and opening discharge opening 159; second, moving the flush valve 156 upwardly and rotating about a vertical axis in a first direction; third, discharging the water from the water tank 122 through the discharge opening 159 of the water tank 122 to flush wastes in the toilet bowl (not shown); fourth, engaging an interaction on the flush valve 156 so that the volume of water used to flush the dual flush toilet system 120 can be controlled according to the waste in the dual flush toilet system 120; fifth, moving the flush valve 156 downwardly and rotating about the vertical axis opposite to the first direction; and sixth seating the flange of the flush valve 156 on the discharge opening 159.

It is understandable that the previously described embodiments can employ any floating device as long as the device has specific gravity less than the specific gravity of water so the floating device can float on the water surface and rises or drops as the water level rises and drops.

Another embodiment of the load device 520 is shown in FIGS. 5A through 5G. The load device comprises a diverter 526 and a reservoir 528 which are mounted on the upper portion of the flush valve 156 and under the refill tube 140. The diverter 526 and the reservoir 528 are used for employing the weight of the water from the refill tube 140 to selectively apply a downward force to the flush valve to forcibly shut down the flush valve 156.

Figure 5A:
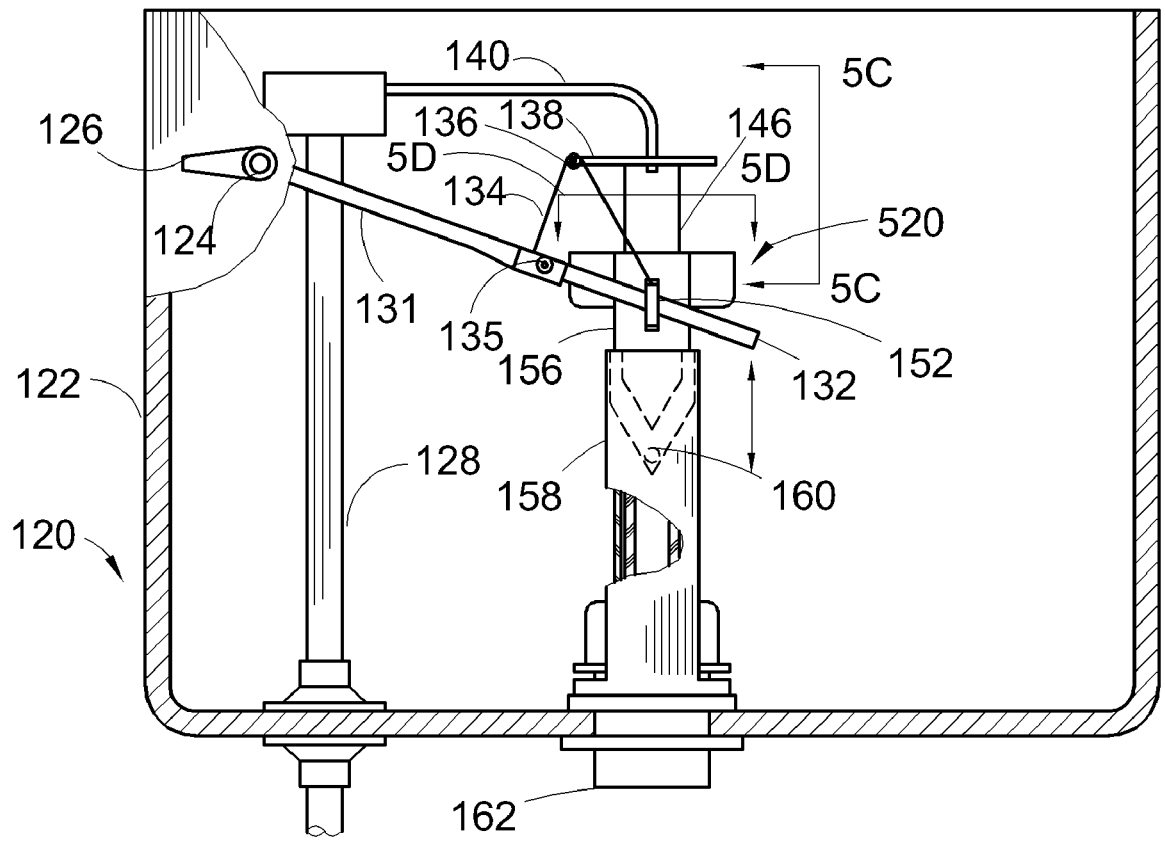
FIG. 5A is a front view of another alternative embodiment of the dual flush toilet system with a load device.
Figure 5B:
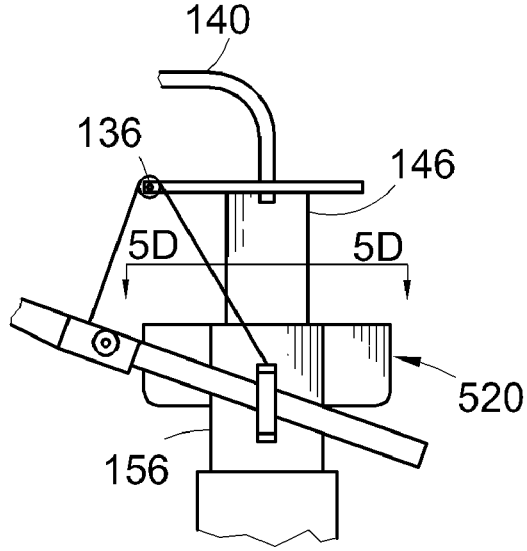
FIG. 5B is an enlarged view of the dual flush system with the load device shown in FIG. 5A.
Figure 5C:
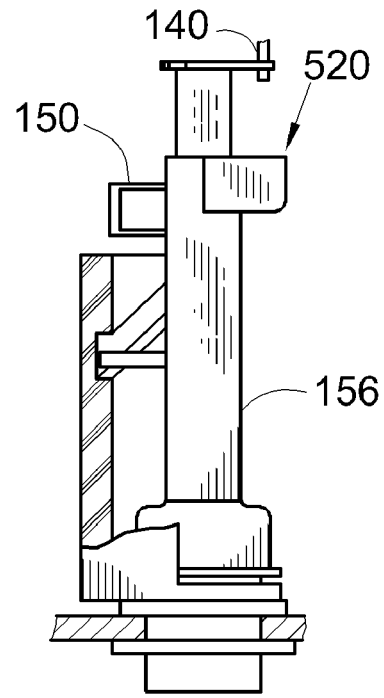
FIG. 5C is the side view of the dual flush toilet system with a load device taken along line 5C—5C shown in FIG. 5A.
Figure 5D:
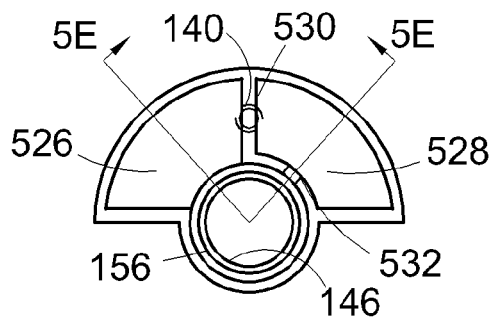
FIG. 5D is an enlarged top view of the dual flush system load device taken along line 5D—5D shown in FIG. 5A.
Figure 5E:
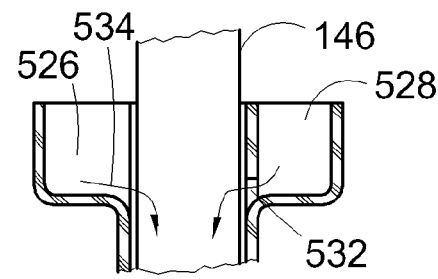
FIG. 5E is a section-view of FIG. 5D taken along line 5E—5E in FIG. 5D.

FIGS. 5B, 5C, 5D, 5E, 5F, and 5G illustrate the structures of the load device 520 in the dual flush toilet system. FIG. 5B shows that the diverter 526 and the reservoir 528 are mounted on the upper end of the flush valve 156 encircling the rear half of the external circumference of the flush valve 156 as shown in FIG. 5C. The diverter 526 and the reservoir 528 have both bottoms extending horizontally radially outwardly from the outer circumferential surface of the flush valve 156 and then joining an upward cylindrical wall encircling the half of the upper portion of the flush valve 156. A separation wall 530 separates the diverter 526 and the reservoir 528. The diverter 526 is for the full flush operations and the reservoir 528 is for the partial flush operations. For the diverter 526 there are only three walls; the inner wall is cut off from the bottom surface of the diverter 526, making the water in the full flush reservoir drain through the open end 534 into the discharge opening 159. The reservoir 528 has four walls: the inner wall and the outer wall, and the two radial walls. The inner and the outer walls are concentric and the two radial walls are 90 degrees apart. There is a draining hole 532 located at the bottom of the inner wall of reservoir 528 as shown in FIG. 5E. The draining hole 532 has a cross-sectional area smaller than the cross-sectional area of the refill tube 140 so that when the refill tube 140 fills water into the reservoir 528, the inflow water is significantly greater than the outflow water from the draining hole 532.

Figure 5F:
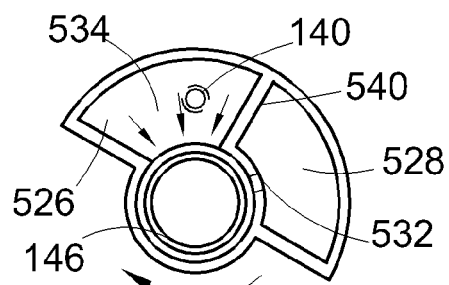
FIG. 5F is a top view of the dual flush toilet system shown in FIG. 5A in a full flush operation.
Figure 5G:
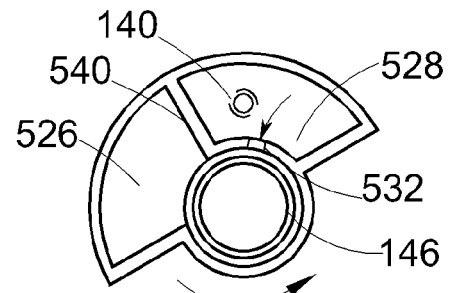
FIG. 5G is a top view of the dual flush toilet system shown in FIG. 5A in a partial flush operation.

Now referring the top views FIGS. 5F and 5G, the operation of the load device 520 is described. When the load device 520 is in the initial position, the end of the refill tube 140 is mounted on the top member 138 directly above the separation wall 530 as shown in FIG. 5D. A user performs a full flush operation by pulling up the flush handle 126. The lever arm 131 rotates clockwise, pulling the cable 134 downward which then pulls the flush valve 156 upwardly and leftwardly. As a result, the diverter 526 now moves underneath the refill tube 140 as shown in FIG. 5F. As the flush valve 156 moves up, it opens the discharge opening 159, the water in the toilet water tank 122 flows into the toilet bowl to flush the waste. As the water lever lowers the float 148 lowers accordingly. The downward movement of the float 148 triggers the refill valve (not shown) to open and the refill pipe 128 refills the water in the toilet water tank 122. Since the refill tube 140 is connected to the refill pipe 128, portion of the water will be divert through the refill tube 140 into the diverter 526. From the FIG. 5E it can be seen that because the inside wall of the diverter 526 is cut off from the bottom the diverter 526 cannot retain the water coming from the refill tube 140. The water in the diverter 526 directly flows from the bottom and drops down through the gap between the flush valve 156 and the spud 146 and further down to the toilet bowl as indicated by the arrows in FIG. 5E. In this situation, there is no significant force applying to the flush valve 156 by the water passing through the diverter. As the water level in the water tank drops to a certain level, the total downward force from the weigh of the flush valve and the suction force of the discharge opening 159, exceeds the buoyancy of the flush valve 156, the flush valve 156 moves downward and closes the discharge opening 159. As the flush valve 156 moves downward, the engaging protrusion 160 moves along the left branch 164L and 162L and then return to its initial position slightly above the vertex 168 of the V-shaped groove 166 as shown in FIG. 1B. When the water in the toilet water tank 122 reaches the predetermined maximum level, the float 148 shuts the refill valve off (not shown). Consequently, the water in the refill tube 140 is turned off. The remaining water in the reservoir 528 continues to drain through the draining hole 532 into the toilet bowl. The full flush operation cycle is complete.

The partial flush operation is described as following. When a user pushes down the flush handle 126, the extension piece 132 pushes the flush valve 156 upwardly and rightwardly. The engaging protrusion 160 engages in the right branch of the V-shaped grooves 166. Hence the flush valve 156 also moves upwardly and rotates counterclockwise about a vertical axis simultaneously. The simultaneous upward movement and counterclockwise rotation make the reservoir 528 turn counterclockwise under the refill tube 140 as shown in FIG. 5G. As the discharge opening 159 is in open position, the water from the toilet water tank 122 flows through the discharge opening 159 and into the toilet bowl.

As the water lever drops, the float 148 drops accordingly. The downward movement of the float 148 triggers the refill valve (not shown) to open and the refill pipe 128 refills the water in the toilet water tank 122. Since the refill tube 140 is connected to the refill pipe 128, portion of the water will be divert through the refill tube 140 into reservoir 528. From FIG. 5E it can be seen that because the draining hole 532 is smaller than the inside diameter of the refill tube 140, the amount of water comes from the refill tube 140 is greater than the amount of water draining out through the draining hole 532. The extra water is held in the reservoir 528. The weight of the water inside the reservoir 528 applies a downward force to the flush valve 156. The extra weight from the water in the reservoir 528 forces the flush valve 156 to move downward and rotate clockwise about a vertical axis. Because of the weight of the water from the reservoir 528, the flush valve 156 closes down sooner than in a full flush operation. Earlier close of the discharge opening 159 results in a smaller volume of water is used to flush the toilet. This realizes the objective of this invention to save water in flushing liquid waste. The amount of water to be saved in the partial flush operation can be achieved by adjusting the inner diameter of the refill tube 140 or the size of the draining hole 532. For example, by increasing the diameter of the refill tube 140 and decreasing the size of the draining hole 532, the water from the refill tube 140 will fill the reservoir 528 faster. As a result, the flush valve 156 closes sooner. An adjustable device such as a flow control valve can be added to the draining hole 532 to adjust the size of the draining hole 532 so the timing to close the valve can be controlled by the ratio of the inner diameter of the refill tube 140 to the size of the draining hole 532. The same principle can also apply to the full flush operation by change the size of the opening of the diverter 526.

Figure 6:
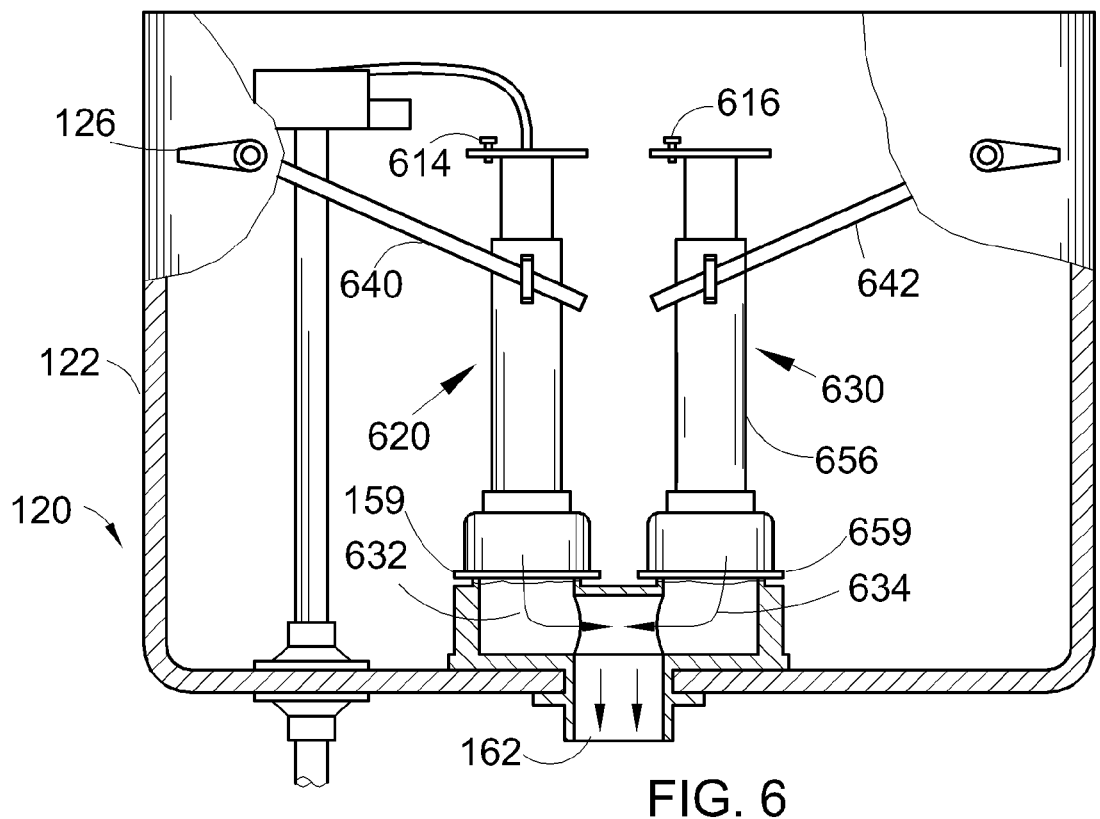
FIG. 6 is a view of another alternative embodiment of the dual flush toilet system employing two flush valves and two flush levers.

Another alternative dual flush toilet embodiment is illustrated in FIG. 6. In this dual flush toilet system, there are two flush valves: a full flush valve system 620 and a partial flush valve system 630. The flush lever 640 operates the full flush valve system 620 and the flush lever 642 operates the partial flush valve system 630, respectively. There are two discharge openings: the first discharge opening 159 and the second discharge opening 659 which are placed side by side generally with a gap between them so that the operation of one flush valve does not affect the other. A discharge passage 632 is connected to the first discharge opening 159 and a discharge passage 634 to the second discharge opening 659. The first discharge opening 159 and the second discharge opening 659 join in the middle to form a draining passage 162 through the bottom wall of the toilet water tank 122. The flush valve 156 is used for the full flush operation and the flush valve 656 is used for the partial flush operation. The flush valve 156 and the flush valve 656 can be identical in structure but have different travel limit devices 614 and 616 so the flush valve 156 has a longer travel and the flush valve 656 has a shorter travel. The flush valve 156 permits a larger volume of water to flow through the discharge opening 159. The flush valve 656 permits small volume of water flow through the discharge opening 659. Alternatively, the flush valve 656 can have a similar structure as described in FIG. 1A. However, the flush valve 656 has a smaller float chamber at the bottom containing smaller amount of air inside the chamber. Hence the buoyancy to the flush valve 656 is smaller than the buoyancy for the flush valve 156. Because of the less buoyancy for the flush valve 656, the flush valve 656 will close the discharge opening 659 sooner than the flush valve 156 does. That is, the volume of water to be used to flush the toilet is smaller hence serves to the purpose of water saving.

Figure 7:
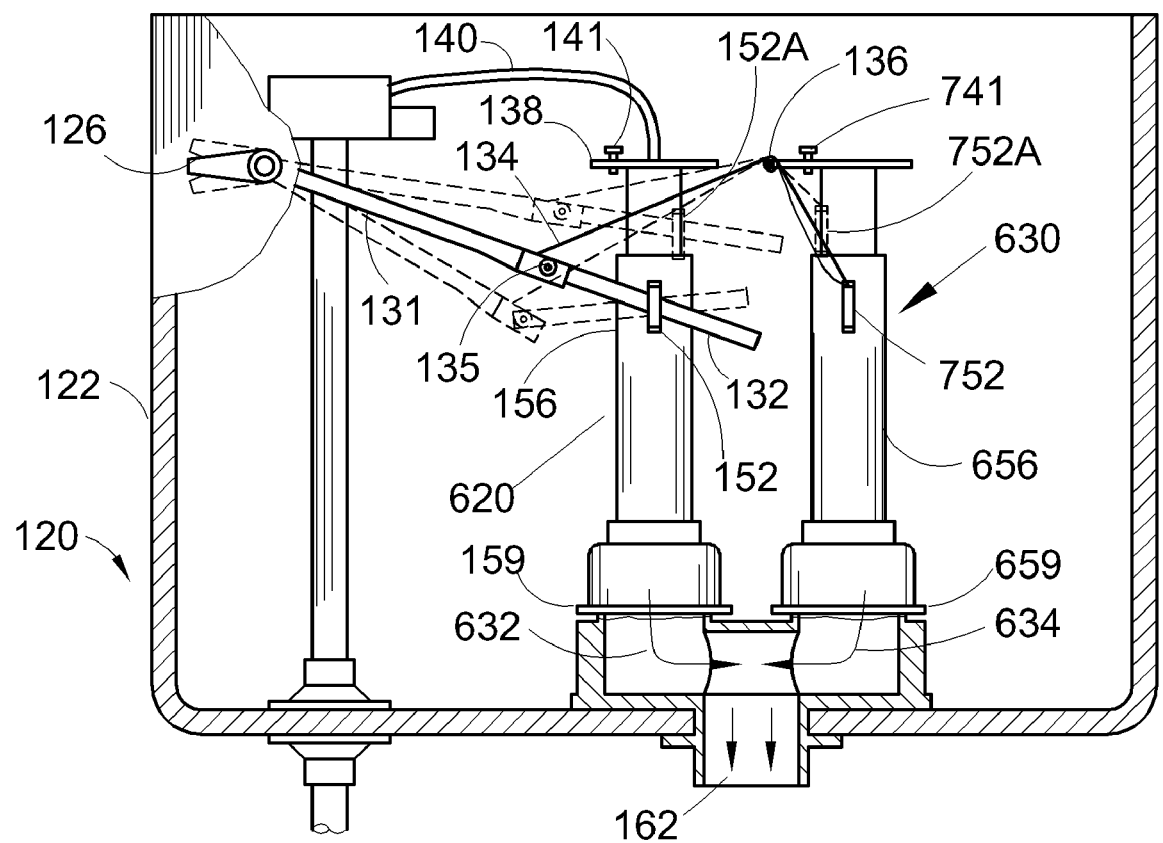
FIG. 7 is a view of another alternative embodiment of the dual flush toilet system using two flush valves and one flush lever.

Another alternative embodiment of dual flush toilet system is shown in FIG. 7. This dual flush toilet system 120 comprises two flush valve systems: 620 and 630 that are described in previous embodiment. In this embodiment the dual flush toilet system 120 employs the dual action flush lever 130 as shown in FIGS. 1E and 1F and fully described in previous embodiments. As shown in FIG. 7 the extension piece 132 of the flush lever 130 is provided to put through the inside the ring 152 affixed on the upper portion of the flush valve 156. One end of the cable 134 is connected to the far end of the lever arm 131. The cable passes through the cable guide 136, which is mounted on the top member 138, is attached to the ring 752 affixed on the upper portion of the flush valve 622. When a user pushes down the toilet flush handle 126, the lever arm 131 and the extension piece 132 rotate counterclockwise and function as one unit. The extension piece 132 pushes the ring 152 both upwardly and rightwardly. As a result, the full flush valve 156 is lifted; the discharge opening 159 is open; and the water in the toilet water tank 122 drains through the discharge opening 159 into the toilet bowl to flush the waste. When the full flush valve 156 moves up, the cable 134 is slacked and has no effect on the flush valve 622. When the water level drops to a predetermined level where the total downward force from the gravity of the flush valve 156, and the suction force form the discharge opening 159 is greater than the buoyancy from the flush valve 156, the flush valve 156 drops down and closes the discharge opening 159. The refill system of the toilet system refills the water and the water level inside the toilet tank 122 return to its original level.

When a user pulls up the flush handle 126 of the flush lever 130, the extension piece 132 rotates about the pivot 135 toward the lever arm 131. The extension piece 132 has no effect on the flush valve 656. Because the cable 134 is pulled downward by the lever arm 131, the cable 134 pulls the ring 752 of the flush valve 656 upwardly and leftwardly. Under such action, the flush valve 656 is lifted up and the discharge opening 659 is open. The water from the toilet tank drops through the discharge opening 659 into the toilet bowl to flush the waste. As the water level drops, the buoyancy from the chamber of the flush valve 656 becomes smaller. The partial flush valve 656 moves downward to close the discharge opening 759. Since the size of the chamber at the bottom of the partial valve 656 is smaller than that of the full flush valve 156, the partial flush valve 656 closes the discharge opening 759 sooner than the full flush valve 156 does. As a result, a smaller volume of water is used to flush the toilet.

Figure 8A:
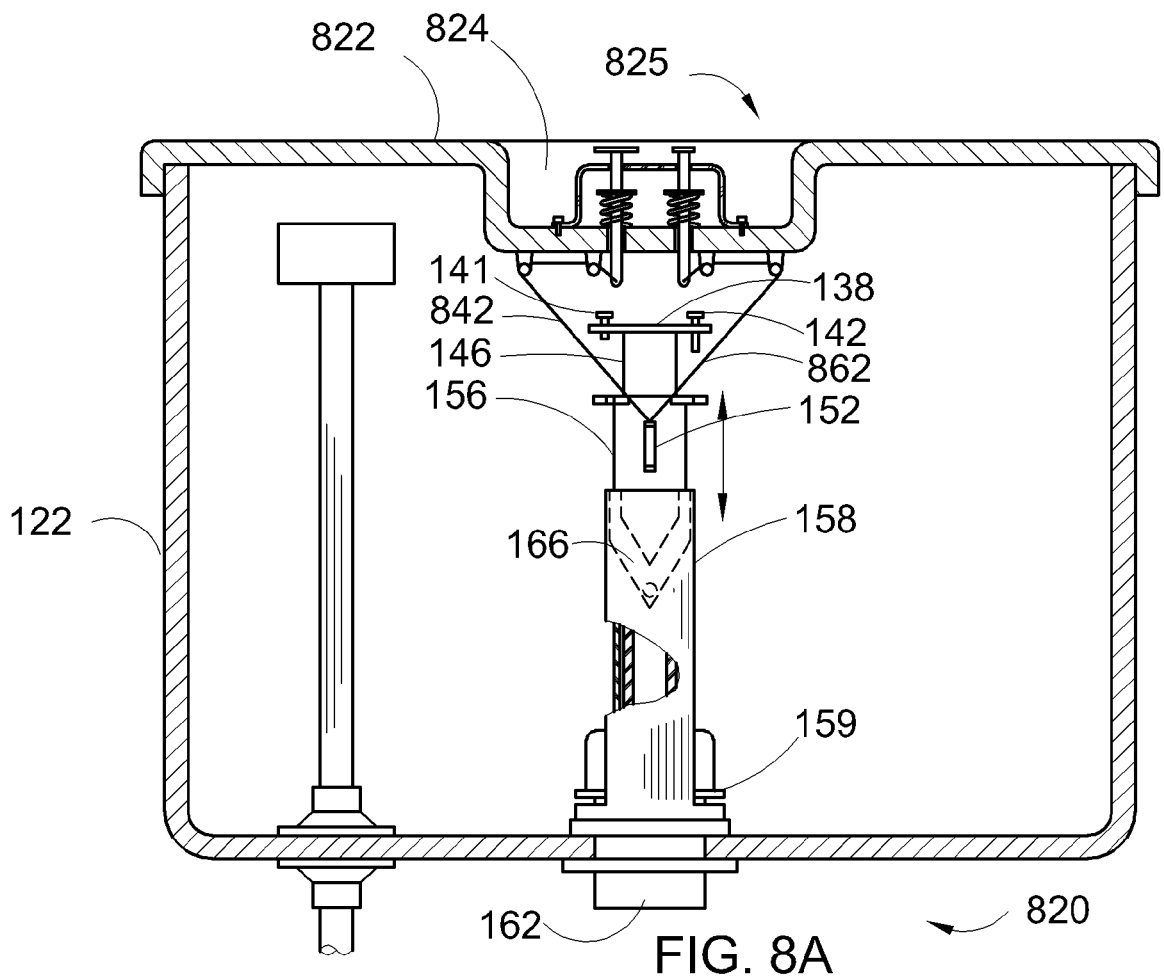
FIG. 8A is another alternative embodiment of the dual flush toilet system with a manual flush device mounted on the water tank cover.
Figure 8B:
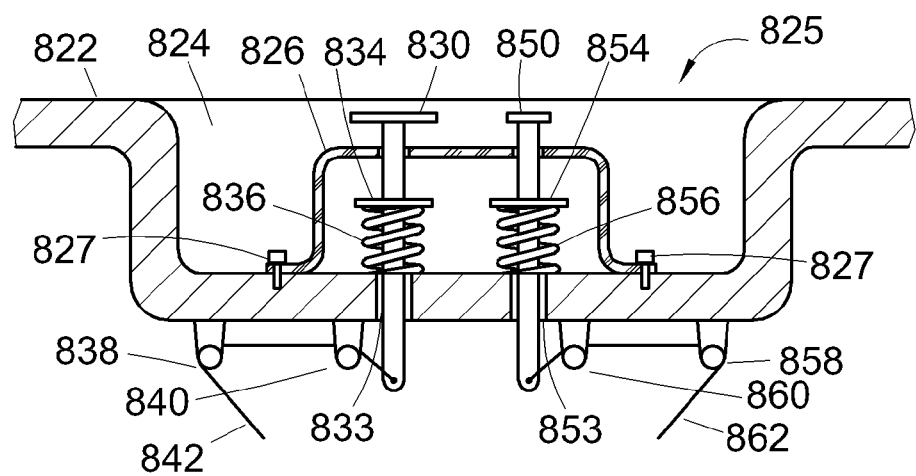
FIG. 8B is an enlarged section view of the dual flush mechanism shown in FIG. 8A.

Another alternative embodiment of dual flush toilet system 820 is illustrated in FIGS. 8A and 8B. The dual flush toilet system 820 comprises a flush valve 156, an engaging member 158, a spud 146, a travel top member 138, a second limit device 142, and two flexible cables 842 and 862. These elements have been described previously and perform the same functions in this embodiment.

In this embodiment, a manual flush control system 825 is mounted on a toilet tank cover 822 which is generally placed on top of the toilet water tank 122 and covers the top opening of the toilet water tank 122. The toilet tank cover 822 has a recess 824 located in the middle portion. There is a housing 826 mounted on the bottom of the recess 824 by two screws 827 to secure the flanges of the housing 825 on the bottom of the recess 824. On the bottom of the recess 824 there are two through holes: 833 and 853. A first push rod 830 has a flat head on the top and a straight body with a hole to be used to attach to one end of a first flexible means 842. The first push rod 830 also has a flange 834 is located in the meddle portion of its body. A spring 836 is provided to set one end against the bottom of the flange 834 and the other end against the bottom of the recess 824 around the hole 833 so that the body portion of the first push rod 830 goes inside the spring coils from the top and slidably passes the hole 833 with the bottom end above the top member 138. The first flexible means 842 can transfer tensional force but cannot transfer compression force because it slacks when a compressing force applies to it. One end of the first flexible means 842 is attached to the top of the ring 152 and the other end attached to the lower end of the first push rod 830 through two cable guides 838 and 840 which are attached on the bottom of the tank cover 822.

Also in the dual flush system 820 a second push rod 850 has a flat head on the top and a straight body with a hole to be used to attach to one end of a second flexible means 862. The partial flush push rod 850 also has a flange 854 mounted in the meddle portion of its body. A spring 856 is provided to set one end against the bottom of the flange 854 and the other end against the bottom of the recess 824 around the hole 853 so that the body portion of the full flush rod 850 goes slidably through the spring coil from the top and slidably passes the hole 853 with the bottom end seating on the top member 138. The second flexible means 862 is a flexible means that can transfer tension force but cannot transfer compression force because it slacks when a compression force is applied to it. One end of the second cable 862 is connected to the top of the ring 152 and the other end attached to the lower end of the second push rod through the two cable guides 858 and 860 which are attached on the bottom of the tank cover 822.

Still referring to FIG. 8B the cable guides 838 and 840 are mounted on the bottom surface of the toilet tank cover 822, facing the top surface of the water in the water tank 122. The two cable guides 838 and 840 are aligned on the left in line with the center of the full flush rod 830. Cable guide 838 is on the left of the flush valve 156 so that the first flexible means 842 is aligned leftwardly and upwardly from the top of the ring 152 to the cable guide 838.

Similarly, cable guides 858 and 860 are mounted on the bottom surface of the toilet tank cover 822, facing the top surface of the water in the water tank 122. The two cable guides 858 and 860 are aligned on the right in line with the center of the partial flush rod 850. Cable guide 858 is on the right of the flush valve 156 so that the flexible means 862 is aligned rightwardly and upwardly from the top of the ring 152 to the cable guide 858.

A user can push either the first push rod 830 or the second push rod 850 to flush the toilet. As illustrated in FIGS. 8A and 1B, when the first push rod 830 is pushed and released, it moves downward. The flange 834 on the first push rod 830 presses the spring 836 downward. Because the lower end of the spring 836 is seated against the top surface of the bottom of the toilet tank cover 822, the spring 836 is compressed. As the lower portion of the first push rod 830 moves downward, the lower end of the first push rod 830 pushes the upper end of the first flexible means 842 downward. The cable guides 838 and 840 are mounted on the left side of the bottom of the toilet tank cover 822. They are used to connect the flush valve 156 and the first push rod 830. When the first push rod is pushed downward, the first flexible means 842 pulls the flush valve 156 upwardly and rotates about a vertical axis clockwise. The engaging protrusion 160 is engaged with the left branch 162L and 164L of the V-shaped groove 166 of the engaging member 158. The flush valve 156 is lifted and the top end of the flush valve 156 moves up until it stops against the first limit device 141. When the user releases the first push rod 830, the spring 836 returns it to its home position. Because the spring returns to its home position, the first push rod 830 also returns to its initial home position. The second flexible means 862 is slacked so it cannot apply any force on the flush valve 156. When the first flush valve 156 is in the full flush operation, it does not have any interference with either the second push rod 850 or the second flexible means 862. Since the flush valve 156 is in a full open position, a large volume of water is discharged through the discharge opening 159. As the water level inside the toilet water tank 122 lowers, the buoyancy of the chamber of the flush valve 156 drops accordingly. When the gravity of the flush valve 156 is greater than its buoyancy the flush valve 156 drops downward and closes the discharge opening 159. During the closing process, the flush valve 156 is guided by the engaging protrusion 160 in the left branch 162L and 164L of the V-shaped grove 166 so that the engaging protrusion 160 moves downwardly along the left branch 164L and 162L of the V-shaped groove 166 and rotates counterclockwise about a vertical axis. At the end of the process the flush valve 156 seats at the vertex 168 without interference with the closing of the discharge opening 159. At this point, the cables 842 and 862 return to their initial positions with no tension but slightly slacked. When the water level in the toilet water tank 122 drops the refill valve (not shown) is activated and the refill pipe 128 starts to fill the water in the toilet water tank 122 until the water level reaches at the predetermined level. The full flushing operation is complete.

The partial flush operation is similar to the full flush operation described in previous embodiment. Still referring to FIGS. 8A and 8B, when the second push rod 850 is pushed and released, it moves downward. The flange 854 on the second push rod 850 presses the spring 856 downward. Because the lower end of the spring 856 seats against the top surface of the bottom of the toilet tank covers 822, the spring 856 is compressed. As the lower portion of the second push rod 850 moves downward, the lower end of the second push rod 850 pushes the upper end of the second flexible means 862 downward. The cable guides 858 and 850 are mounted on the right side of the bottom of the toilet tank cover 822. They are employed to connect the flush valve 156 and the second push rod 850. When the second push rod 850 is pushed downward, the cable 862 pulls the flush valve 156 upwardly and rotates about a vertical axis counterclockwise. The engaging protrusion 160 is engaged with the right branch 162R and 164R of the V-shaped groove 166. The flush valve 156 is lifted and the top end of the flush valve 156 moves up and stops when it meets the second limit device 142. The spring 856 returns to its home position after the user releases the flush rod 850. Because the spring 856 returns to its home position, the second push rod 850 also returns to its initial home position. The first flexible means 842 is slacked so it cannot apply any force on the flush valve 156. When the first flush valve 156 is in the full flush operation, it does not have any interference with either the first push rod 830 or the first flexible means 842. Since the flush valve 156 is in a partial flushing position, a smaller volume of water is discharged through the discharge opening 159. As the water level inside the toilet water tank 122 drops, the buoyancy of the chamber of the flush valve 156 drops accordingly. When the gravity of the flush valve 156 is greater than its buoyancy, the flush valve 156 downward and closes the discharge opening 159. During the closing process, the flush valve 156 is guided by the engaging protrusion 160 in the right branch 162R and 164R of the V-shaped grove 166 so that the engaging protrusion 160 moves downwardly along the right branch 164R and 162R of the V-shaped groove 166 and rotates clockwise about a vertical axis. At the end of the process the flush valve 156 seats at the vertex 168 without interference with the closing of the discharge opening 159. At this point, the cables 842 and 862 return to their initial positions with no tension but slightly slacked. When the water level in the toilet water tank 122 drops the refill valve (not shown) is activated and the refill pipe 128 starts to fill water in the toilet water tank 122 until the water level reaches at predetermined level. The partial flushing operation is complete. It has been noted that in order for the dual flush valve to accommodate different types of water tanks, the vertical position of the second limit device 142 can be adjusted so the optimal volume of water can be maintained regardless of the size of the toilet tank. Also, the load devices discussed previously can also be applied to this embodiment.

Figure 8C:
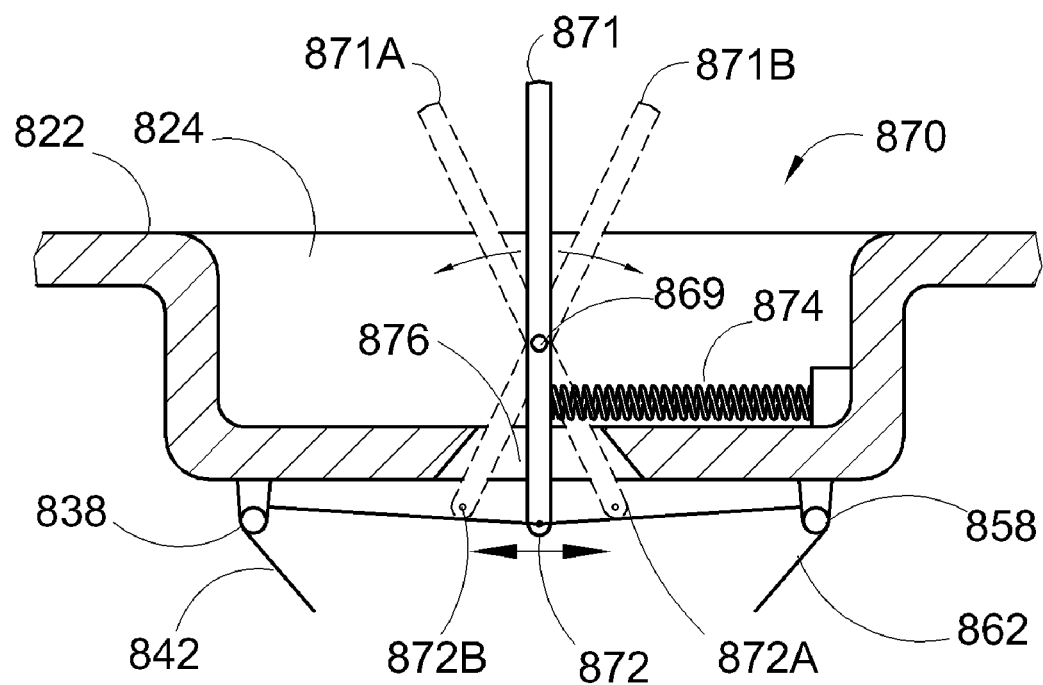
FIG. 8C is an alternative embodiment of the dual flush toilet system with manual operation.

Another alternative embodiment of the top mounted dual flush device 870 is shown in FIG. 8C. Device 870 comprises a flush rod 871, a pivot 869, and a spring 874. There is an opening 876 on the bottom of the recess of the toilet tank cover 822. The flush rod 871 has straight body in the middle pivotally connected to the pivot 869 so that the flush rod 871 can rotate about a primarily horizontal axis of the pivot 869. The flush road 871 has an initial vertical position with its upper end above the top surface of the toilet tank cover 822 and the lower end below the bottom surface of the toilet tank cover 822. The spring 874 is horizontally placed on the bottom of the recess 824. One end of the spring 874 is connected to an unmoving surface and the other end connected to the flush rod 871 below the pivot 869. The upper end of the first flexible means 842 is connected through the cable guide 838 to the lower end 872 of the flush rod 871 primarily horizontally. The upper end of the second flexible means 862 is connected through the cable guide 858 to the lower end 872 of the flush rod 871 primarily horizontally.

Pulling the flush rod 871 leftward or rightward and then release it can perform a full flush operation or a partial flush operation. When the user releases the flush rod 871, it returns to its initial position because the spring 874 restores to its original length after stretched or compressed. If a user pulls the upper end of the flush rod 871 leftward to position 871A and then release it, the lower end 872 of the flush valve moves rightward to position 872A because the flush rod rotates around the pivot 869. The first flexible means 842, connected to the lower end 872 of the flush rod 871, also moves to the position 872A. As a result of this movement, the first flexible means 842 pulls the flush valve 156 upwardly and rotates it clockwise simultaneously. The flush valve 156 is open and the water in the toilet water tank 122 discharges through the discharge opening 159 into the toilet bowl to flush the waste. The detailed full flush operation process is fully described in previous embodiments. Once the flush valve 156 is activated and moves upward, both cables 842 and 862 are slacked so they do not apply any force on the flush valve 156. When the flush valve 156 retunes to its initial position, the cables 842 and 862 are slightly slacked with no tensions so that the cables 842 and 862 does not affect the closing of the flange of the discharge opening 159 but with a little pulling from the flush rod 871 they will transfer tension to operate the flush valve 156.

If the user pulls the upper end of the flush rod 871 rightward to position 871B and then releases it, the lower end 872 of the flush valve moves leftward to position 872B because the flush rod rotates around the pivot 869. The second flexible means 862 connected to the lower end 872 of the flush rod 871 also moves to the position 872B. As a result of this movement, the second flexible means 862 pulls the flush valve 156 upwardly and rotates counterclockwise. The flush valve 156 is open and the water in the toilet water tank 122 discharges through the discharge opening 159 into the toilet bowl to flush the waste. The detailed partial flush operation process is described fully in previous embodiments. Once the flush valve 156 is activated and moves upward, both cables 842 and 862 are slacked so they do not apply any force on the flush valve 156. When the flush valve 156 retunes to its initial position, the cables 842 and 862 are slightly slacked with no tensions so that the cables 842 and 862 does not affect the closing of the flange of the discharge opening 159 but with a little pulling from the flush rod 871 they will transfer tension to operate the flush valve 156.

Figure 8D:
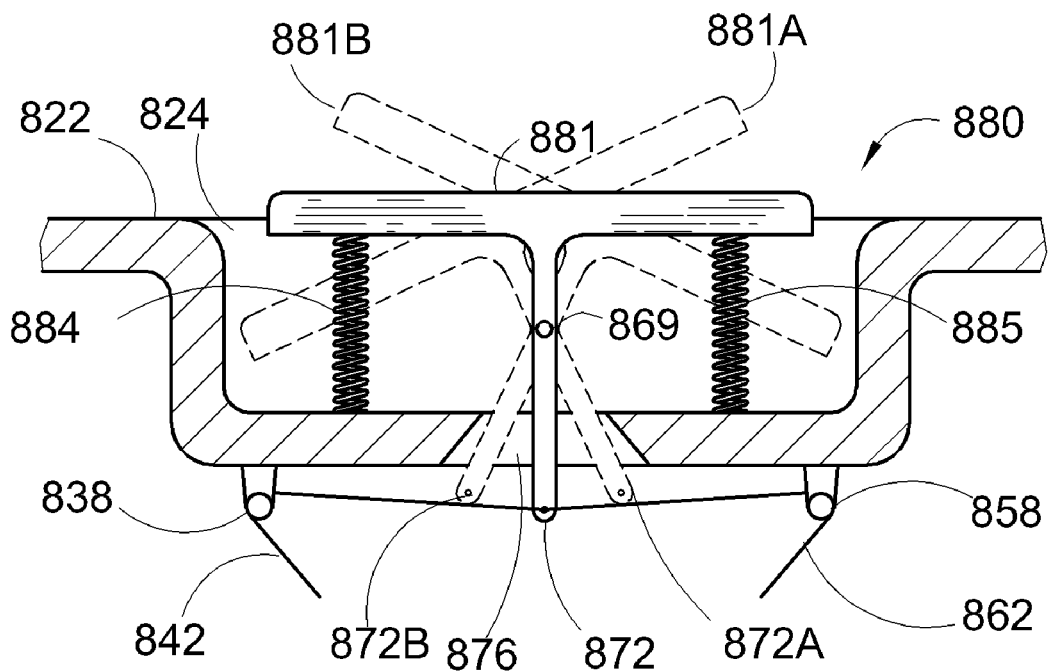
FIG. 8D is another enlarged section view of the dual flush toilet system shown in FIG. 8C.

Yet another alternative embodiment for the top mounted flush operation device 880 is shown in FIG. 8D. Instead of using a flush rod to operate the flush valve, device 880 employs a push pad 881 and two springs 884 and 885 to accomplish the dual flush operations. The push pad has a T-shaped member with a flat plate on the top and a straight body underneath upwardly connected to the middle of the bottom surface of the flat plate. The lower end 872 of the push pad 881 has the same structure and performs the same functions as the device 870 described in the previous embodiment. The top surface of the flat top of the push pad 881 is generally parallel to the top surface of the toilet tank cover 822. The lower end of the spring 884 is secured on the left of the bottom of the recess 824 and the upper end of the spring 884 is demountably connected to the left of the bottom surface of the flat top of the push pad 881. Similarly, the lower end of the spring 885 is secured on the right of the bottom of the recess 824 and the upper end of the spring 885 is demountably connected to the right of the bottom surface of the flat top of the push pad 881. When the push pad 881 is not in operation, both springs 884 and 885 are generally in neutral position with minimum support of the weight of the push pad 881. In the middle portion of the push pad 881 the pivot 869 is employed to pivotally connect the body of the push pad. The front wall and the back wall of the recess 824 support both ends of the pivot so that the push pad 881 can rotate about a primarily horizontal axis of the pivot 869. When a user pushes the left side 881A of the push pad 881 and then releases it, the push pad 881 rotates counterclockwise about the pivot 869 so the lower end 882 moves to 872A. As described in previous embodiment of the dual flush toilet system 820, the lower end 872 pulls the first flexible means 842 to lift the flush valve 156 to perform a full flush operation. Similarly, when a user pushes the right side 881B of the push pad 881 and then releases it, the push pad 881 rotates clockwise about the pivot 869 so the lower end 882 moves to 872B. Also as described in previous embodiment of the dual flush toilet system 820, the lower end 872 pulls the second flexible means 862 to lift the flush valve 156 to perform a partial flush operation.

Figure 9A:
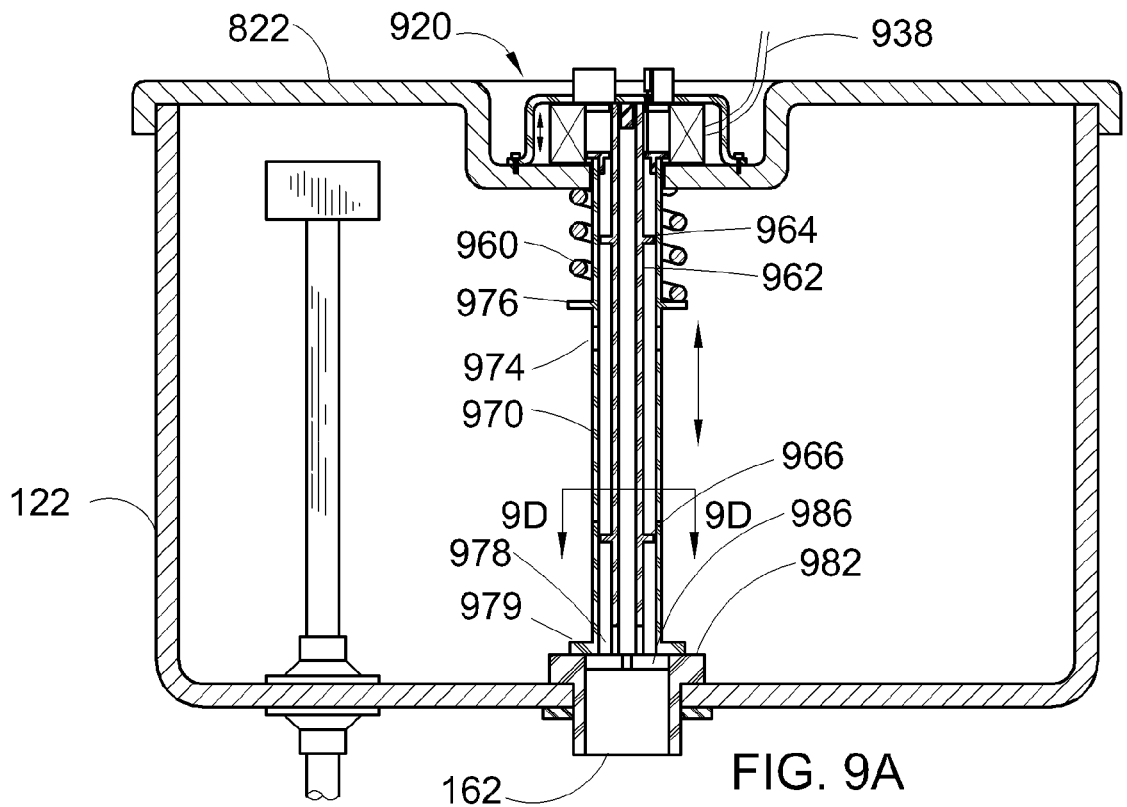
FIG. 9A is an electronically controlled dual flush toilet system.
Figure 9B:
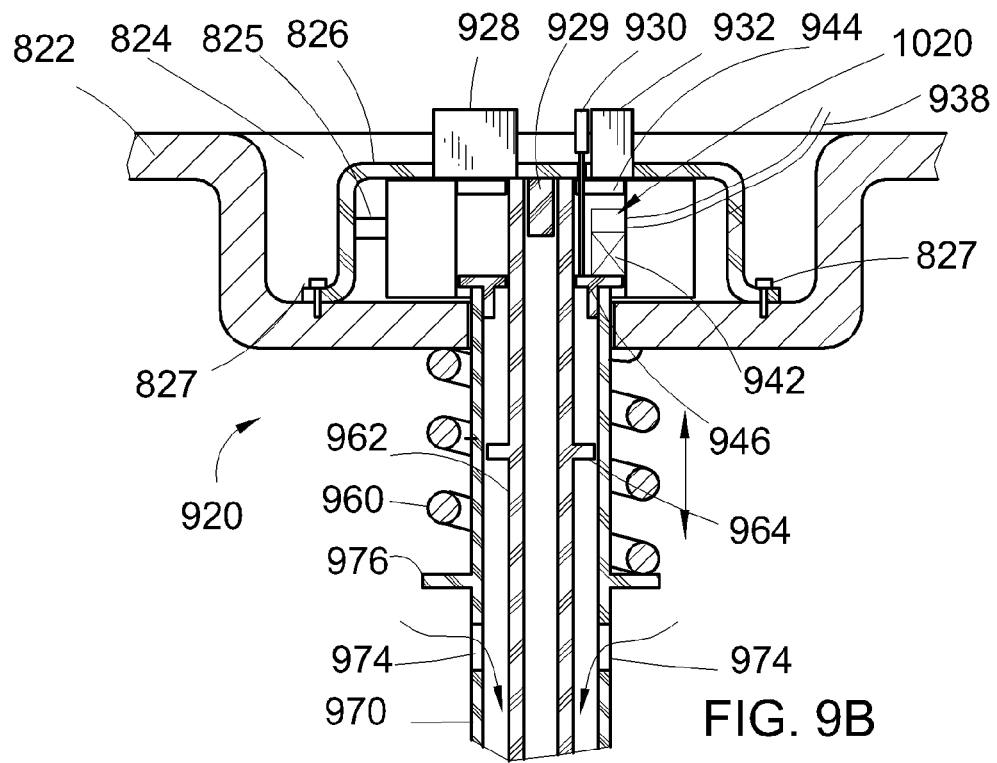
FIG. 9B is an enlarged section view of the electrically controlled dual flush toilet system shown in FIG. 9A.
Figure 9C:
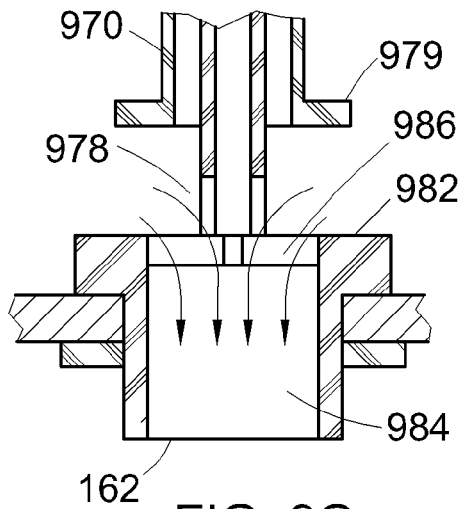
FIG. 9C is a section view of the bottom of electric controlled dual flush toilet system shown in FIG. 9A.
Figure 9D:
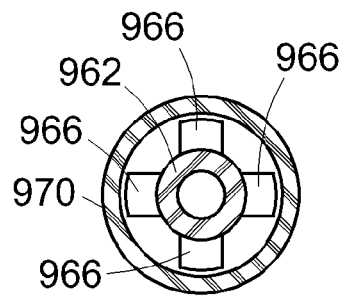
FIG. 9D is a section view taken along line 9D—9D showing the guide protrusions of the spud and the dual flush valve in FIG. 9A.
Figure 10:
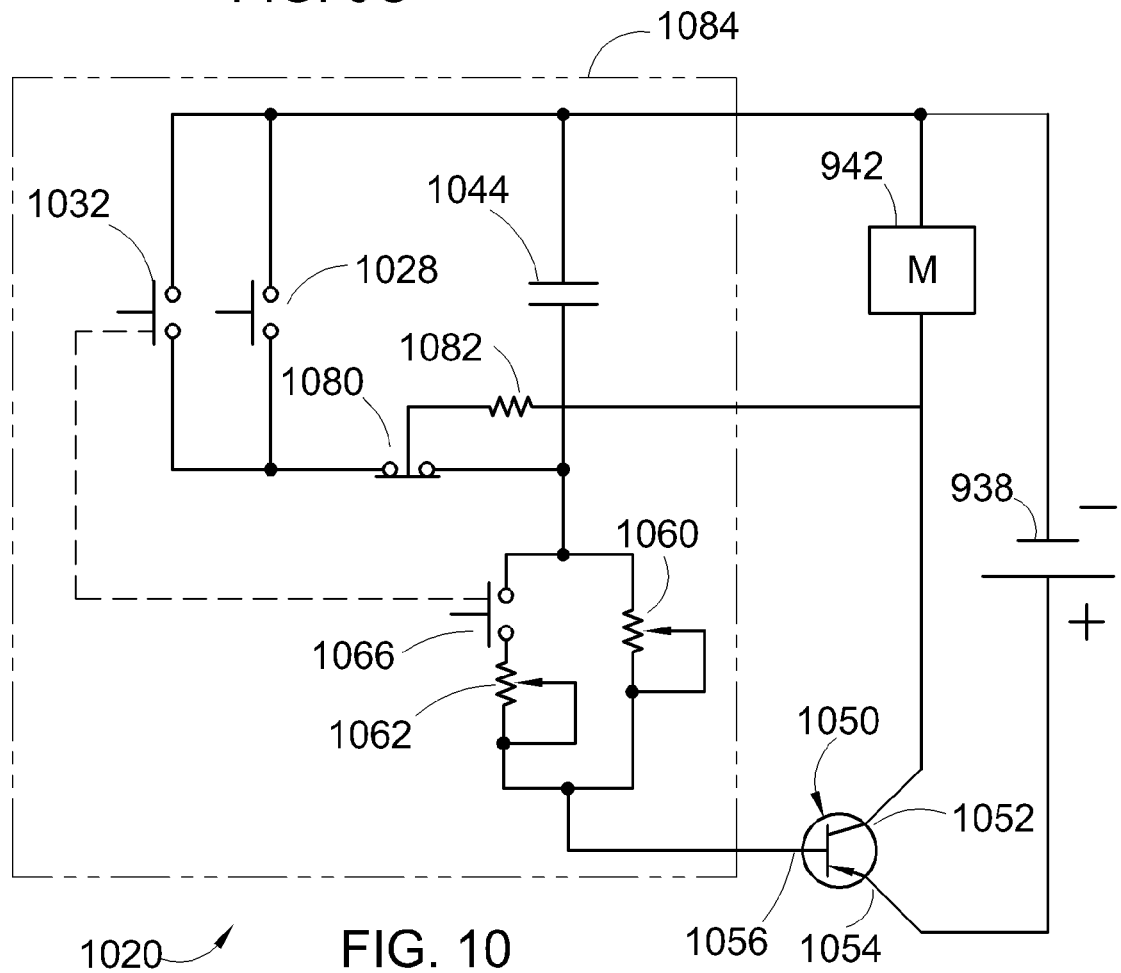
FIG. 10 is a view of control circuit employed to control the dual toilet flush system shown in FIG. 9A.

FIGS. 9A, 9B, 9C, 9D, and 10 show another alternative embodiment of the dual flush toilet system 920. An electrical control system 1020 as shown in FIG. 10 controls this dual flush toilet system 920.

Referring to FIGS. 9A and 9B, the dual flush toilet system 920 comprises a toilet tank cover 822 with a recess 824 for covering the opening of the toilet water tank 122, a first button 928 for activating a full flush operation, a second button 932 for activating a partial flush operation, a manual flush handle 930 for flushing the toilet when there is no electrical voltage source available, a spring 960 for returning the flush valve 970 to its closing position after discharging the water from the toilet water tank 122, an flush valve guide 964 for guiding the flush valve 970 to move slidably along the vertical direction of the flush valve guide 962, a cover plate 946, a flush valve 970 for controlling the water flow from the toilet water tank 122 into the toilet bowl (not shown), an electrical-mechanical actuating means 942 for opening or closing the flush valve 970, a discharge opening 982 for allowing the water inside the toilet tank to discharge into the toilet bowl, and a D.C. voltage source 938 for providing electrical power to operate and control the actuating means 942.

The toilet cover 822 is the same as what is described in the embodiment of the dual flush toilet system 820. There are three holes on the top surface of the recess 824 as illustrated in FIG. 9B: the one on the left is for accessing the first button 928, the one on the right is for accessing the second button 932, and the one in the middle is for accessing the emergency flush handle 930. The first button 928 is coupled with a first switch 1028 employed to activate a full flush operation. When a user pushes the first button 928 and releases it, the first switch 1028 is in an "ON" position. The toilet system performs a full flush operation. Similarly, the second button 932 is coupled with a second switch 1032 employed to activate the second switch 1032. When a user pushes the second button 932 and releases it, the second switch 1032 is in an "ON" position and the toilet system performs a partial flush operation. The control system 1020 is designed to perform the function that it does not require a user to push and hold the first button 928 or the second button 932. The system is designed in such a way that the operations of either a full flush operation or a partial flush operation will not be affected by the duration of a user's pushing and holding of the buttons. In other words, the system is insensitive to the variations of users' patterns of pushing or holding these buttons. This insensitivity of the performance of the first button 928 and the second button 932 makes this embodiment of the dual toilet flush system function consistent and achieve the water saving objective.

The manual flush handle 930 can be a cable, a cord, or a rod with a ring on the upper end above the top surface of the housing 826 slidably going down through the hole and with the lower end connected to the top plate 946 for pulling up the flush valve 970 when there is no electricity available to operate the system. In this case, this dual flush toilet system 920 is still functional and has no interruptions to the use of the toilet. The top plate 946 is an annular plate with a cylindrical body approximately in the middle of the bottom side as shown in FIG. 9B.

The circumference of the inner hole of the top plate 946 is slidably engaged with the outer circumferential surface of the upper valve guide 962 so that the top plate 946 can slidably move upwardly and downwardly along the vertical axis of the valve guide 962. The outer cylindrical surface of the top plate 946 is screwably screwed into the threaded inner hole of the flush valve 970 so these two parts are assembled as one to move together. The top surface of the outer circumference of the top plate 946 is connected to the actuating means 942 which can drive the top plate 946 and the flush valve 970 upwardly and downwardly to control the flush operations of the dual flush toilet system 920.

The bottom of the valve guide 962 is connected to the base of the water discharge opening 982. Plurality of radial ribs 986, which are radially spaced on the draining passage 162, support the valve guide 962 but allow the water to flow through the spaces between these ribs 986 down to the discharge opening 982. The top end of the valve guide 962 is engaged in a rod 929, which is fixedly secured on the inner surface of the housing 826 and slidably engaged with the valve guide 962.

There are pluralities of radially horizontally spaced annular protrusions 966 shown in FIG. 9D. They are located in the lower portion of the valve guide 962 as shown in FIG. 9A. The outer circumferences of these protrusions 966 are cylindrical and are slidably engaged with the inner wall of the flush valve 970. The protrusions 966 are employed to reduce the frictions between theses protrusions 964 and the cylindrical surface of the flush valve 970 when the flush valve 970 moves upwardly and downwardly in flushing operations.

The flush valve 970 has a tubular body. At the lower end the flush valve 970 there is a flange 979 that covers and seals against the water discharge opening 982. In the upper portion of the flush valve 970 there is at least one but preferably four overflow openings 974 cut through the wall of the flush valve 970, permitting the water from the toilet water tank 122 to flow through these openings 974 into the toilet bowl (not shown) in case the water inlet valve cannot be shut off. On the outer wall of the upper portion of the flush valve 970 there is a circular spring base 976 as shown in FIG. 9B. The spring base 976 has a flat upper surface against the lower end of the spring 960. The top end of the flush valve 970 is screwably connected to the top plate 946 so the actuating means 942 can drive the top plate 946 and the flush valve 970 upwardly and downwardly to open and close the water discharge opening 982.

The spring 960 is employed for pressing the flush valve 970 downward to close the flush valve 970 when a flush operation is complete and for providing additional downward force for the flush valve 970 to seal the water discharge opening 982. The lower end of the spring 960 is slidably inserted into the upper portion of the flush valve 970 until the bottom of the spring 960 rests against the top of the spring base 976 and the upper end against the bottom surface of the toilet tank cover 822. When the flush valve 970 is in a close position, the spring 960 is compressed because the length of the spring 960 under neutral condition is longer than the distance between the top surface of the spring base 972 and the bottom surface of the toilet tank cover 822, hence it applies a downward force on the flush valve 970 so the bottom flange 979 of the flush valve 970 seats on the flange of the discharge opening 982 and seals the opening without leaking water from the toilet water tank 122.

The actuating means 942 is mounted inside the housing 826 for opening and closing the flush valve 970. The actuating means 942 can be an electrical motor or an electric-magnetic driving device such as a solenoid used to activate the flush valve 970. The actuating means 942 is employed to lift the flush valve 970 upwardly to open the discharge opening or push the flush valve 970 downwardly to return to its original closing position. The actuating means 942 is controlled by the control system 1020 which will be described later. The D.C. voltage source 938 is provided for supplying power to the dual flush toilet system 920.

Drawings in FIGS. 9B and 9C illustrate the operations for the electrical controlled dual flush toilet system 920. To operate this toilet system, a user can push either the first button 928 or the second button 932. When the first button 928 is pushed and released, as shown in FIG. 9C the actuating means 942 is activated. The actuating means 942 lifts the top plate 946 and the flush valve 970 up and holds for certain amount of time to permit the water inside the toilet water tank 122 to flow into the toilet bowl through the discharge opening 984. When the flush valve 970 is lifted up, the spring base 976 is also lifted up so the spring 972 is compressed. When the actuating means releases the flush valve 970, the compressed spring 960 applies a downward force on the base plate 972 to force the flush valve 970 downward to close the water discharge opening 982. It is noted that even without the spring 972, the flush valve 970 is still able to function properly to close the discharge opening 982 by means of its own weight to pull the flush valve 970 down.

The partial flush operation is similar to the full flush operation described above. The only difference is that the duration for the flush valve to stay in the open position is shorter than the full flush cycle. As a result, the volume of the water flowing from the toilet water tank 122 into the toilet bowl is less than the volume of water from a full flush operation.

Now referring FIG. 10 the flush control system 1020 controls the flush process of the dual flush toilet system 920. The flush control system 1020 comprises a transistor 1050 for providing control to the actuating means 942, and a timing device 1084, which is presented inside the phantom-lined block, for controlling the time of the flush of the dual flush toilet system 920. The timing device 1084 comprises a first switch 1028 for activating on a full flush operation, a second switch 1032 for activating a partial flush operation, a first variable resistor 1060 and a second variable resistor 1062 for adjusting the toilet flushing time, a third switch 1066 for changing the resistance of the system for performing a partial flush operation, a fourth switch 1080 for controlling the timing of the first switch 1028 and the second switch 1032, a third resistor 1082 for delaying the switching action of the switch 1080, and a capacitor 1044 for charging or discharging electricity to control the timing of the flushing.

As shown in FIG. 10, the transistor 1050 has an emitter 1054, a first base 1052, and a second base 1056. For the timing device 1084, the first switch 1028 is connected between the negative terminal of the D.C. voltage source 938 and the negative terminal of the fourth switch 1080. The second switch 1032 is connected to the negative terminal of the D.C. voltage source 938 and the negative terminal of the fourth switch 1080. The capacitor 1044 is connected between the negative terminal of the D.C. voltage source 938 and the negative terminal of the first variable resistor 1060. The fourth switch 1080 has its positive terminal connected to the negative terminal of the first variable resistor 1060 and is controlled by the actuating means 942. The second variable resistor 1062 is connected to the positive terminal of the third switch 1066 and the second base 1056 of the transistor 1050. The first variable resistor 1060 has its positive terminal connected to the second base 1056 of the transistor 1050. The third switch 1066, which is connected to the positive terminal of the capacitor 1044 and is normally in open position, is coupled with the second switch 1032 to control the "ON" or "OFF" position of the second variable resistor 1062. The actuating means 942 is connected between the negative terminal of the D.C. voltage source 938 and the first base 1052 of the transistor 1050. The positive terminals of resistors 1060 and 1062 are connected to the second base 1056 of the resistor 1050. The emitter 1054 is connected to the positive terminal of the voltage source 938.

When a user pushes the full flush button 928 and releases it, the first push switch 1028 is turned on. The electrical energy stored in the capacitor 1044 is discharged through the short loop via the switch 1028. When the user releases the button 928, the first switch 1028 is tuned off. The capacitor 1044 starts to charge. As a result, a voltage is provided to the actuating means 942. The actuating means 942 then opens the flush valve 970. The first variable resistor 1060 controls the length of the charging of the capacitor 1044. When the capacitor 1044 is fully charged, there is no current flowing through the second base 1056. Hence the current from the first base 1052 is also cut off. As a result, the actuating means 942 is turned off. The flush valve 970 moves downward and closes the discharge opening 982. The first variable resistor 1060 controls the length of the electricity charging to the capacitor 1044. Since the resistance of the first variable resistor 1060 can be adjusted, the duration of the flushing of the dual flush toilet changes accordingly. That process completes a full flush operation. It is noticed that the capacitor 1044 can also be adjustable for controlling the length of the time to flush the dual flush toilet system 920.

The partial flush operation is similar to the full flush operation. The only difference is that the flushing length is shorter than a full flushing. The third switch 1066 is employed to perform the task. When the second switch 1032 is turned on, it also activates the third switch 1066, making the first variable resistor 1060 and the second variable resistor 1062 in a parallel connection. For two parallel-connected resistors 1060 and 1062, their combined resulting resistance is smaller than either the first variable resistor 1060 or the second variable resistor 1062. A smaller resistance will result in a faster charge for the capacitor 1044. That shorter charging time of the capacitor 1044 completes a partial flush operation.

The first variable resistor 1060 or the second variable resistor 1062 can be independently adjusted to accommodate to variety of timing to suit for different toilet tanks for selectively performing full flush operations or partial flush operations with optimal volume of water.

The above embodiment is only one of the embodiments to perform the same function of dual flushing. The resistor in this embodiment is a PNP resistor. Similarly an NPN resistor can also be used in this application. The same control system 1020 can also be employed to control the dual flush operations for a hemisphere-shaped flapper valve 1030 shown in FIG. 11A, in which the flapper valve with the overflow pipe generally securely fixed on the bottom of the toilet tank. With a linking mechanism to link the actuating means 942 to the flapper valve 1030. The operation of a full flush operation or a partial flush operation is the same as the one described in previous paragraphs.

Above described embodiments are primarily for the plunger-shaped flush valve with combined overflow a pipe and a float chamber. Still, there is another type of flapper flush valve in which the overflow pipe is separated from the flush valve. In the flapper flush valve the overflow pipe is a separate unit and does not move with the valve body upwardly or downwardly; it is secured generally on the discharge opening. The preferred embodiment of this invention is described in FIGS. 11A through 11L. In this embodiment the dual flush toilet system 1120 has a flapper flush valve 1130 for providing a full flush operation or a partial flush operation. The dual flush toilet system 1120 comprises an overflow pipe 1126 for permitting the water in the toilet water tank 122 to flow though a discharge opening 1140 into the toilet bowl to prevent the excessive water spill over the toilet water tank 122 and for holding and supporting a flapper valve 1130 to open and close the discharge opening 1140 as a user to activate the flush valve 1130.

The overflow pipe 1126 is a thin-walled pipe with an elongated body standing upright with the bottom end connected to the discharge opening 1140 and the top end rising above the water level when the toilet water tank 122 is fully filled. One end of the refill tube 140 is receivablly inserted into the top end of the overflow pipe to refill the water in the toilet bowl after the completion of the flush. At the top of the overflow pipe 1126 there is a support member 1132 which is cantileverally hung from the overflow pipe extending outwardly over the flapper valve 1130. At the far end of the support member 1132 there is a guide 1134 permitting a first flexible means 1122 to pass through the eye of the guide 1134. One end of the first flexible means 1122 is attached to the first eyelet 1123 on the top left of the flapper valve 1130 and then passes through the guide 1134 to connect to the lever arm 131 of the flush lever 130. A second flexible means 1124 is employed for activating the partial flush operation. One end of the second flexible means 1124 is connected to a second eyelet 1125 on the top right of the flapper valve 1130 and the other end is connected to the extension piece 132 of the flush lever 130.

The flapper valve 1130 is a thin-walled hemisphere-shaped means with a chamber on the lower portion for opening and closing the discharge opening 1140 and controlling the timing for a full flush operation or a partial flush operation. On the top middle portion of the flapper valve 1130 there is a primarily horizontal axis 1172 as shown in FIGS. 11A and 11B. The axis 1172 is attached to the top surface of the flapper valve 1130. The outward portions of both ends of the axis 1172 are pivotally engaged in the supports near the far end of the flapper valve arm 1128 so the flapper valve 1130 can pivotally rotate about the horizontal axis 1172 as shown in FIGS. 11C and 11D. When the first flexible means 1122 lifts the flapper valve 1130 upward, the flapper arm 1128 rotates about a pivot 1129 on the overflow pipe 1126. The flapper valve 1130 not only moves upward but also rotates clockwise about the axis 1172 as shown in FIG. 11C. When the second flexible means 1124 lifts the flapper valve 1130 upward, the flapper arm 1128 rotates about a pivot 1129 on the overflow pipe 1126. The flapper valve 1130 not only moves upward but also rotates counterclockwise about the axis 1172 as shown in FIG. 11D.

Figure 11E:
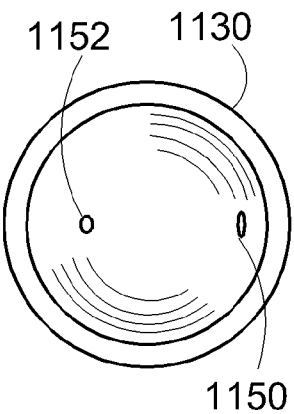
FIG. 11E is a bottom view of an alternative embodiment of the flapper valve.
Figure 11F:
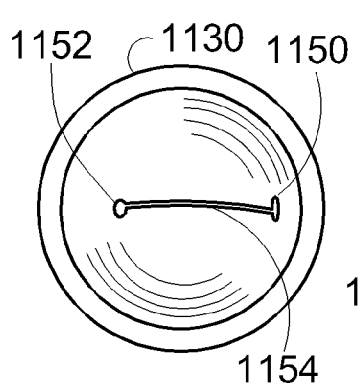
FIG. 11F is a bottom view of another alternative embodiment of the flapper valve.
Figure 11G:
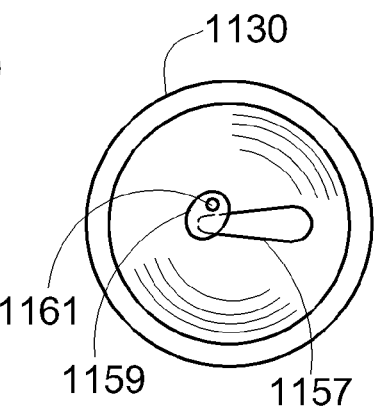
FIG. 11G is a bottom view of another alternative embodiment of the flapper valve.

On the flapper valve 1130 there is at least one hole 1157 as shown in FIGS. 11F and 11G located on the chamber for controlling the time for the flapper valve 1130 to stay in open position. The flapper valve 1130 with two holes is also shown in FIG. 11E. All these holes are cut through the wall of the flapper valve 1130 so that the water or the air can enter the chamber or escape from the chamber of the flapper valve 1130. The holes can have different shapes and sizes. As shown in FIG. 11E, two holes 1150 and 1152 are located on the lower portion of the flapper valve 1130. The hole 1150 is on the right side of the flapper valve 1130 and the hole 1152 is on the left side of the flapper valve 1130. When the flapper valve 1130 is in the closing position, the hole 1150 is located in a higher elevation than the hole 1152. As shown in FIG. 11F the flapper valve 1130 has one hole with a narrow middle portion 1154 and relatively wider opening at both ends 1152 and 1150. As a result, they become one hole because there is only one closed loop on the surface of the flapper valve 1130. FIG. 11G shows one hole 1157 with narrower left portion on the flapper valve 1130.

As shown in FIG. 11D, when the flapper valve 1130 is pulled up by the second flexible means 1124, the flapper valve 1130 moves upwardly with the arm 1128 and rotates counterclockwise about the horizontal axis 1172. As shown in FIG. 11C when the flapper valve 1130 is pulled up by the first flexible means 1122, the flapper valve 1130, moves upwardly with the arm 1128 and rotates clockwise about the axis 1172.

Figure 11H:
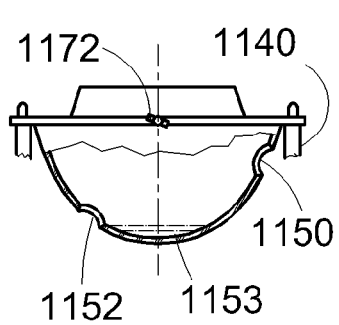
FIG. 11H is a bottom view of the flapper valve in an initial position for the dual flush toilet system.
Figure 11I:
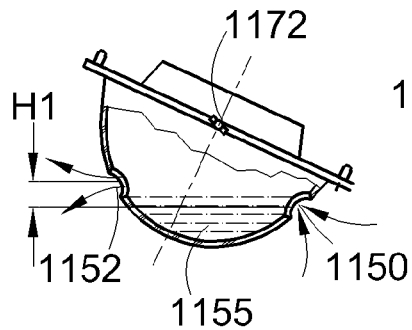
FIG. 11I is a view of the flapper valve in a full flushing operation position for the dual flush toilet system.
Figure 11J:
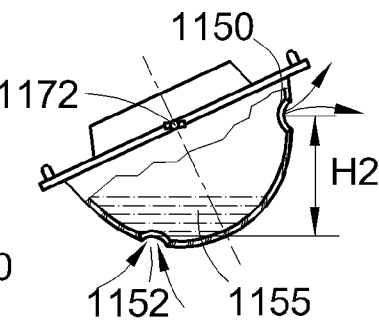
FIG. 11J is a view of the flapper valve in a partial flushing operation position for the dual flush toilet system.
Figure 11K:
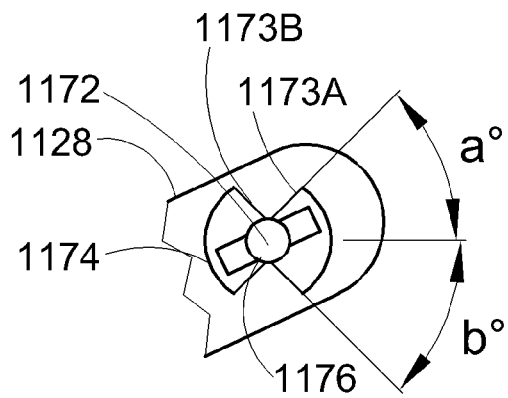
FIG. 11K is a view of the embodiment of the connection between the flapper valve and the frame shown in FIG. 11B.

There are two shoulders: 1173A and 1173B, as shown in FIG. 11K, located at the far end of the support 1174 of the arm 1128 to prevent the axis 1172 from rotating beyond a predetermined angle. The maximum counterclockwise rotation is indicated in "a" degrees and the maximum clockwise rotation is indicated in "b" degrees as shown in FIG. 11K. As shown in FIG. 11D when the flapper valve 1130 is activated, the flapper valve 1130 will move up as the arm 1128 is pulled up. The flapper valve 1130 rotates about the axis 1172 counterclockwise. The rotation about the axis 1172 is constrained by the stop shoulder 1173A when one side of the rotation stop bar 1176 contacts the stop surface of the shoulder 1173A. In this case the maximum angle is "a". The position of the stop shoulder 1173A can be changed so the axis 1172 can rotate more or less as the toilet system requires accommodating the shape and the depth of the toilet water tank 122.

When the first flexible means 1122 is activated, the flapper valve 1130 is lifted upward and rotates clockwise about the horizontal axis 1172. The rotation stop bar 1176 is constrained by the stop shoulder 1173B. The maximum rotation angle is "b" as shown in FIG. 11K. The initial position for the shoulders 1173A and 1173B can be adjusted by rotating the axis 1172.

The flapper valve 1130 can control different flush operations by lifting either the first flexible means 1122 or the second flexible means 1124. When the flap valve 1130 is in a close position as shown in FIGS. 11A and 11B, the bottom of the flapper valve 1130 is exposed to the air. Only a small amount of water 1153 below the lower edge of the hole 1152, as shown in FIG. 11H, remains inside the bottom of the flapper valve 1130.

When the flapper valve 1130 seats on the discharge opening 1140 where the bottom surface of its flange is against the top surface of the discharge opening 1140. The lower portion of the flapper valve is exposed to the air. The water pressure from the toilet water tank 122 presses the flapper valve 1130 against the discharge opening 1140. When a user pulls up the flush lever 130 up, the lever arm 131 rotates clockwise to pull the first flexible means 1122 up through the cable guide 1134. Consequently, the flapper valve 1130 moves upwardly and rotates clockwise about the axis 1172 as shown in FIG. 11C. The arm 1128 also moves up with the flapper valve 1130. The discharge opening 1140 is open and the water from the toilet tank is drained to the toilet bowl to flush the waste. In this situation, because of the air trapped inside the chamber of the flapper valve 1130, the buoyancy from the air is greater than the gravities of the flapper valve 1130 and the arm 1128, the flapper valve 1130 stays in the open position at which the hole 1152 is located above the hole 1150 as shown in FIG. 11C. Once the flapper valve 1130 is in the open position, the flapper valve 1130 is submerged in the water. Under the differences of the hydraulic pressure between the hole 1150 and the hole 1152, the air inside the flapper valve 1130 escapes the chamber through the hole 1152 and the water from the tank enters the chamber of the flapper valve 1130 through the hole 1150 as shown in FIG. 11I. As more air escapes from the hole 1152 and more water enters the chamber of the flapper flush valve 1130 through the hole 1150, the buoyancy of the flapper valve 1130 becomes smaller. As shown in FIG. 11I when the volume of the water inside the chamber of the flapper valve 1130 exceeds the critical volume 1155, at which the buoyancy of the flapper valve is equal to weight of the flapper valve 1130 and the arm 1128, the flapper valve 1130 moves downward and closes the discharge opening 1140. This cycle completes a partial flush operation.

When a user pushes down the flush handle 126, the extension piece 132 pulls up the second flexible means 1124 as shown in FIGS. 11B and 11D. The flapper valve 1130 moves upwardly and rotates counterclockwise about the axis 1172 until it is stopped by the shoulder 1173A as shown in FIG. 11D. It is similar to the partial flush operation described previously. The vertical distance H2 between the hole 1150 and the hole 1152 when the flush valve 1130 rotates counterclockwise as shown in FIG. 11J is greater than the vertical distance H1 between the hole 1150 and the hole 1152 when the flush valve 1130 rotates clockwise as illustrated in FIG. 11I. The larger hole 1150 is vertically at a higher elevation than the smaller hole 1152. The speed of the water entering into the chamber inside the flapper valve 1130 is slower. Hence it takes longer for the water to enter into the chamber of the flapper valve 1130 and to reach the critical volume of water 1155 for gaining enough downward force. As a result, the flapper valve 1130 moves downward and closes the discharge opening 1140. This process competes a full flush operation.

The duration of flushing the toilet system is determined by the time the flapper valve staying in the open position controlled by the speed of the water entering the chamber of the flapper valve 1130 through the hole 1150. This can be determined by the relative vertical distance between the hole 1150 and the hole 1152 under the hydraulic pressure and the relative sizes of the hole 1150 and the hole 1152. Generally, the larger of the vertical distance between these two holes, the faster the water enters the chamber of the flapper valve 1130. Because the viscosity of water is greater than the viscosity of the air, under normal temperature and pressure of the toilet working condition, the water escapes from the chamber of the flapper valve 1130 at a lower speed than the air does from the same hole. As a result, reversing the positions of these two holes changes the speed of the water entering the chamber of the flapper valve 1130. Changing the size of the hole 1150 and the size of the hole 1152 also change the speed of the water entering the chamber of the flapper valve 1130. As shown in FIG. 11G the size of the holes can be adjusted by adjusting a covering member 1159 that is adjustable and is attached to the flapper valve 1130 outer surface near the hole opening by a connecting member 1171. By rotating the covering member 1159 around the connecting member 1171 clockwise or counterclockwise, the area of the opening of the hole 1157 can be decreased or increased. The locations and sizes of the holes 1150 and 1152 can vary according to the requirements of the time to keep the flapper valve 1130 in open position.

The operation processes of the hemisphere-shaped dual flush toilet system 1120 are described as following steps: the first step is activating the flapper valve 1130 from the water tank 122 by pulling the first flexible means 1122 or the second flexible means 1124. The second step is lifting the flapper valve 1130 upwardly and rotating about the horizontal axis in one direction. The third step is discharging the water from the water tank 122 through the discharge opening 1140 of the water tank 122 to flush the waste. The fourth step is decreasing buoyancy of the flapper valve 1130 by replacing the air inside the flapper valve 1130 with the water from the water tank 122. The fifth step is moving the flapper valve 1130 downwardly and rotating it about the horizontal axis in opposite direction. The sixth step is seating the flange of the flapper valve 1130 on the discharge opening 1140.

The electronic controlled dual flush toilet system 1020 shown in FIG. 10 can also be easily applied to the hemisphere-shaped flapper valve. The actuating means 942 can be attached to the flapper valve 1130 to open or close the discharge opening 1140. The flushing time can be controlled in the same manner as using the control system 1020 described previously.

Other embodiments, features, and advantages of the present invention will be apparent to those skilled in the art from a consideration of the foregoing specifications as well as through practice of the invention and alternative embodiments and methods disclosed herein. Therefore, it should be emphasized that the specifications and examples are exemplary only, and the true scope and spirit of the invention is limited only by the following claims.

What is claimed is:

1. A dual flush toilet system for selectively flushing solid waste or liquid waste, said dual flush toilet system comprising:
   a water tank with a discharge opening on the bottom of said water tank for storing and receiving water;
   a toilet bowl located below said water tank and connected to said water tank by said discharge opening;
   a spud having an elongated upstanding body with a lower end secured on said discharge opening of said water tank;
   a flush valve comprising a tubular element upstanding and extending above the water surface in said water tank and slidably engaged with said spud, a float chamber attached on the lower portion of said tubular element, and a ring attached at the upper portion of said tubular element;
   engaging means connecting said flush valve and a support for engaging the movement of said flush valve to perform a full flush operation or a partial flush operation to flush wastes in said toilet bowl; and
   wherein said engaging means engages said flush valve with both vertical and rotational movement about a vertical axis.

2. The dual flush toilet system according to claim 1, further comprising:
   limit means for limiting the vertical travel of said flush valve, wherein said limit means engages the interactions between said flush valve and a support, wherein said limit means comprises a limit member, a stop member, and adjustable means for adjusting the vertical movement limit of said flush valve, and wherein said stop member selectively engages with said limit member; and
   a load device attached to float means for selectively engaging and applying a downward force on said flush valve in a flush operation, wherein said load device engages said flush valve with said float means for controlling the timing to push said flush valve downward to close said discharge opening, and wherein said load device comprises adjustable means for adjusting the timing to apply a downward load to said flush valve.

3. The dual flush toilet system according to claim 1, further comprising:
   limit means for limiting the vertical travel of said flush valve, wherein said limit means engages the interactions between said flush valve and a support, wherein said limit means comprises a limit member, a stop member, and adjustable means for adjusting the vertical movement limit of said flush valve, and wherein said stop member selectively engages with said limit member; and
   a load device attached to float means for selectively engaging and applying a downward force on said flush valve in a flush operation, wherein said load device engages said flush valve with said float means for controlling the timing to push said flush valve downward to close said discharge opening, and wherein said load device comprises adjustable means for adjusting the timing to apply a downward load to said flush valve, wherein said engaging means comprises a protrusion element and a groove member with a V-shaped groove recessed in said groove member, wherein said protrusion element is slidably engaged with said V-shaped groove.

4. A dual flush toilet system for selectively flushing solid waste or liquid waste, said dual flush toilet system comprising:

a water tank with a discharge opening on the bottom of said water tank for storing and receiving water;

a toilet bowl located below said water tank and connected to said water tank by said discharge opening;

a spud having an elongated upstanding body with a lower end secured on said discharge opening of said water tank;

a flush valve comprising a tubular element upstanding and extending above the water surface in said water tank and slidably engaged with said spud, a float chamber attached on the lower portion of said tubular element, and a ring attached at the upper portion of said tubular element;

engaging means connecting said flush valve and a support for engaging the movement of said flush valve to perform a full flush operation or a partial flush operation to flush wastes in said toilet bowl; and wherein said engaging means comprises a protrusion element and a groove member with a V-shaped groove recessed in said groove member, wherein said protrusion element is slidably engaged with said V-shaped groove.

5. A dual flush toilet system for selectively flushing solid waste or liquid waste, said dual flush toilet system comprising:

a water tank with a discharge opening on the bottom of said water tank for storing and receiving water;

a toilet bowl located below said water tank and connected to said water tank by said discharge opening;

a spud having an elongated upstanding body with a lower end secured on said discharge opening of said water tank;

a flush valve comprising a tubular element upstanding and extending above the water surface in said water tank and slidably engaged with said spud, a float chamber attached on the lower portion of said tubular element, and a ring attached at the upper portion of said tubular element;

engaging means connecting said flush valve and a support for engaging the movement of said flush valve to perform a full flush operation or a partial flush operation to flush wastes in said toilet bowl; and limit means for limiting the vertical movement of said flush valve, wherein said limit means engages said flush valve and a support, wherein said limit means comprises a limit member, a stop member, and adjustable means for adjusting the vertical movement limit of said flush valve, and wherein said stop member selectively engages with said limit member.

6. A dual flush toilet system for selectively flushing solid waste or liquid waste: said dual flush toilet system comprising:

a water tank with a discharge opening on the bottom of said water tank for storing and receiving water;

a toilet bowl located below said water tank and connected to said water tank by said discharge opening;

a spud having an elongated upstanding body with a lower end secured on said discharge opening of said water tank;

a flush valve comprising a tubular element upstanding and extending above the water surface in said water tank and slidably engaged with said spud, a float chamber attached on the lower portion of said tubular element, and a ring attached at the upper portion of said tubular element;

engaging means connecting said flush valve and a support for engaging the movement of said flush valve to perform a full flush operation or a partial flush operation to flush wastes in said toilet bowl; and a load device attached to float means for selectively engaging and applying a downward force on said flush valve in a flush operation, wherein said load device engages said flush valve with said float means for controlling the timing to push said flush valve downward to close said discharge opening and wherein said load device comprises adjustable means for adjusting the timing to apply a downward load to said flush valve.

* * * * *